United States Patent
Donea et al.

(10) Patent No.: US 10,196,494 B2
(45) Date of Patent: Feb. 5, 2019

(54) POLYMERIC SHEETS, METHODS FOR MAKING AND USING THE SAME, AND ARTICLES COMPRISING POLYMERIC SHEETS

(71) Applicant: SABIC Global Technologies B.V., Bergen op Zoom (NL)

(72) Inventors: Constantin Donea, Evansville, IN (US); Safwat E. Tadros, Evansville, IN (US); Hendrik Cornelis Jacobus de Nooijer, Middelburg (NL); Christianus Johannes Jacobus Maas, Rilland (NL); Michael M. Laurin, Pittsfield, MA (US); Sandeep Dhawan, Newburgh, IN (US); Shuailei Ma, Evansville, IN (US); Michael J. Davis, Mount Vernon, IN (US); Jian Zhou, Evansville, IN (US); Yuanqing He, Newburgh, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 330 days.

(21) Appl. No.: 14/767,686

(22) PCT Filed: Feb. 21, 2014

(86) PCT No.: PCT/US2014/017531
§ 371 (c)(1),
(2) Date: Aug. 13, 2015

(87) PCT Pub. No.: WO2014/130751
PCT Pub. Date: Aug. 28, 2014

(65) Prior Publication Data
US 2016/0002429 A1    Jan. 7, 2016

Related U.S. Application Data

(60) Provisional application No. 61/767,396, filed on Feb. 21, 2013.

(51) Int. Cl.
*B32B 27/02*    (2006.01)
*C08J 9/14*    (2006.01)
(Continued)

(52) U.S. Cl.
CPC ............... *C08J 9/142* (2013.01); *B29C 44/24* (2013.01); *B29C 44/505* (2016.11);
(Continued)

(58) Field of Classification Search
CPC ..... B29C 44/24; B29C 44/505; B32B 27/065; B32B 2250/40; B32B 2250/42;
(Continued)

(56) References Cited

U.S. PATENT DOCUMENTS 6,492,015 B1    12/2002  Aoki et al.
7,695,815 B2 *   4/2010  Agarwal ................ B32B 27/08
                                                                428/412

(Continued)

FOREIGN PATENT DOCUMENTS

CN    101395222 A    3/2009
EP      0166820 A1    1/1986
(Continued)

OTHER PUBLICATIONS

Definition of Lamellar.*
(Continued)

*Primary Examiner* — Travis M Figg
(74) *Attorney, Agent, or Firm* — Cantor Colburn LLP

(57) ABSTRACT

In one embodiment, a polymeric sheet, comprising: a foamed layer comprising a polymeric material, wherein the polymeric material has a Tg of greater than or equal to 100° C.; and wherein the sheet has a weight reduction of 10% to 60%, as compared to a solid sheet of the same geometry and size formed from the same polymeric material. The sheet, at the thickness of 1.0 mm, has a smoke density of less than or
(Continued)

equal to 200 particles after four minutes of burning according to ASTM E662-06. The sheet is thermoformable.

20 Claims, 8 Drawing Sheets

(51) Int. Cl.
| | |
|---|---|
| *B32B 27/06* | (2006.01) |
| *B29C 44/24* | (2006.01) |
| *C08J 9/00* | (2006.01) |
| *C08J 9/08* | (2006.01) |
| *C08J 9/36* | (2006.01) |
| *B29C 44/50* | (2006.01) |

(52) U.S. Cl.
CPC .......... *B32B 27/065* (2013.01); *C08J 9/0061* (2013.01); *C08J 9/0066* (2013.01); *C08J 9/08* (2013.01); *C08J 9/36* (2013.01); *B32B 2250/40* (2013.01); *B32B 2250/42* (2013.01); *B32B 2264/0207* (2013.01); *B32B 2264/102* (2013.01); *B32B 2266/0214* (2013.01); *B32B 2266/08* (2013.01); *B32B 2307/3065* (2013.01); *B32B 2307/406* (2013.01); *B32B 2307/712* (2013.01); *B32B 2307/718* (2013.01); *B32B 2605/00* (2013.01); *B32B 2605/003* (2013.01); *C08J 2201/03* (2013.01); *C08J 2203/00* (2013.01); *C08J 2369/00* (2013.01); *C08J 2433/08* (2013.01)

(58) Field of Classification Search
CPC ...... B32B 2264/0207; B32B 2264/102; B32B 2266/0214; B32B 2266/08; B32B 2307/3065; B32B 2307/40; C08J 9/0061; C08J 9/0066; C08J 9/08; C08J 9/142; C08J 9/36
USPC ......................................................... 428/220
See application file for complete search history.

(56) References Cited

U.S. PATENT DOCUMENTS

| | | | |
|---|---|---|---|
| 7,790,292 | B2 | 9/2010 | Colborn et al. |
| 9,352,755 | B2 | 5/2016 | Van Der Mee et al. |
| 9,982,130 | B2 | 5/2018 | Sybert et al. |
| 2004/0197545 | A1 | 10/2004 | Gehlsen et al. |
| 2007/0027271 | A1 | 2/2007 | Davis et al. |
| 2007/0149629 | A1* | 6/2007 | Donovan ............... C08J 9/0061 521/134 |
| 2009/0130420 | A1* | 5/2009 | Thiagarajan ............... C08J 9/04 428/221 |
| 2011/0274900 | A1 | 11/2011 | Megally et al. |
| 2012/0059078 | A1 | 3/2012 | Kim et al. |
| 2012/0251750 | A1 | 10/2012 | Sybert et al. |
| 2012/0252961 | A1* | 10/2012 | Sybert ..................... C08L 69/00 524/537 |
| 2012/0267480 | A1 | 10/2012 | Sybert et al. |
| 2013/0197119 | A1* | 8/2013 | Stapleton ................ B29C 44/00 521/180 |
| 2013/0224462 | A1 | 8/2013 | Van Der Mee et al. |
| 2013/0280535 | A1* | 10/2013 | Maas ..................... A62C 2/065 428/412 |
| 2014/0326163 | A1 | 11/2014 | Van Der Mee et al. |
| 2014/0329940 | A1 | 11/2014 | Van Der Mee et al. |
| 2014/0370213 | A1 | 12/2014 | Van Der Mee et al. |
| 2017/0283612 | A1 | 10/2017 | Sybert et al. |
| 2017/0306147 | A1 | 10/2017 | Sharma et al. |

FOREIGN PATENT DOCUMENTS

| | | |
|---|---|---|
| EP | 1090744 B1 | 6/2007 |
| EP | 2423250 A2 | 2/2012 |
| EP | 2426174 A1 | 3/2012 |
| JP | 8066953 A | 3/1996 |
| JP | 10330524 A | 12/1998 |
| JP | 2926635 B2 | 7/1999 |
| JP | 3142964 B2 | 3/2001 |
| RU | 2466157 C2 | 10/2011 |
| WO | 0007812 A1 | 2/2000 |
| WO | 2009004528 A1 | 1/2009 |
| WO | 2012054595 A1 | 4/2012 |
| WO | 2013020129 A2 | 2/2013 |
| WO | 2013130809 A1 | 9/2013 |
| WO | 2016085790 A1 | 6/2016 |
| WO | 2016085928 A1 | 6/2016 |

OTHER PUBLICATIONS

J. Florian, "Practical Thermoforming: Principles and Applications," CRC Press, p. 42, 1992.
Lee et al, "Polymeric Foams; Technology and Develpornent in Regulation, Process , and Products," 2011, p. 33.
Xiao et al, "Chemical Additives for Polymeric Materials," Chemical Industry, 2003 p. 139.
Jingzhen, "Foam Molding Principle," Chemical Industry Press, Aug. 2005, pp. 49.
Zhao et al., "Polymer Processing Engineering," China Light Industry Press, Polymer Materials and Engineering Series, Mar. 2001, pp. 393.
European Patent No. 0166820 A1; Publication Date: Jan. 8, 1986; Abstract Only, 1 page.
International Search Report for International Application No. PCT/US2014/017531; International Filing Date Feb. 21, 2014; dated Aug. 1, 2014; 5 pages.
Japanese Patent No. 10330524 A; Publication Date: Dec. 15, 1998; Abstract Only, 1 page.
Japanese Patent No. 2926635; Publication Date: Jul. 28, 1999; Abstract Only, 2 pages.
Japanese Patent No. 3142964; Publication Date: Mar. 7, 2001; Abstract Only, 2 pages.
Japanese Patent No. 8066953 A; Publication Date: Mar. 12, 1996; Abstract Only, 1 page.
Written Opinion for International Application No. PCT/US2014/017531; International Filing Date Feb. 21, 2014; dated Aug. 1, 2014; 5 pages.
Written Opinion of the International Preliminary Examining Authority for International Application No. PCT/US2014/017531; International Filing Date Feb. 21, 2014; dated Feb. 18, 2015; 7 pages.

* cited by examiner

US 10,196,494 B2

POLYMERIC SHEETS, METHODS FOR MAKING AND USING THE SAME, AND ARTICLES COMPRISING POLYMERIC SHEETS

CROSS REFERENCE TO RELATED APPLICATIONS

This application is a national stage application of International Application No. PCT/US2014/017531 filed Feb. 21, 2014 which claims the benefit of U.S. Provisional Patent Application Ser. No. 61/767,396 filed Feb. 21, 2013, and, both of which are incorporated herein by reference in their entirety.

TECHNICAL FIELD

Disclosed herein are textured polymeric sheets, specifically polymeric sheets comprising a foamed core layer or foamed cap layer(s).

BACKGROUND

Polymeric (e.g., polycarbonate) sheet material is commonly used in rail and aircraft applications, e.g., in seats or cladding applications. These applications typically require that stringent fire safety requirements are met such as flame retardance, smoke density, smoke toxicity, and heat release. Polymeric materials such as polycarbonate have difficulty meeting heat release requirements for aircraft and rail applications and often have to be combined with other, more expensive materials, to pass the aircraft and rail application tests. Various requirements have been placed on the flame retardance, smoke density, smoke toxicity, and heat release properties of the sheet materials used in the construction of interior panels and parts for aircraft and rail applications.

Lightweight polymeric sheets and products derived therefrom have achieved a considerable and significant commercial success in a number of fields. These lightweight sheets have been employed in aircraft and other structures for insulation and structural purposes. The electronics and appliance industry uses polymer foams for electrical and thermal insulation and for structural purposes. Aircraft interior components currently utilize low density foamed and honeycomb structure materials. These materials provide excellent stiffness and low weight, but are difficult to thermoform and require additional lamination of other sheet and/or film materials to produce a sheet with an aesthetic surface.

Multilayer sheets that can meet or exceed the various fire safety requirements (e.g., in rail and/or aircraft applications), are desired in the industry. Additionally, multilayer sheets that can meet or exceed the various fire safety requirements in transportation interior applications; that can be thermoformed without an adverse effect on adhesion or heat stability of the layers of the multilayer sheet; and have low gloss levels for minimizing light reflection, are also desired.

Thus, there is a need for lightweight polymeric sheets that can be thermoformed and that do not require additional lamination of other sheets/films to produce a sheet with a functional purpose of, for example, reducing overall weight, improved fire safety, and/or have an aesthetic surface.

SUMMARY

Disclosed, in various embodiments, are polymeric sheets, and methods for making the same and articles using the same.

In one embodiment, a polymeric sheet can comprise: a foamed layer comprising a polymeric material, wherein the polymeric material has a Tg of greater than or equal to 100° C.; and wherein the sheet has a weight reduction of 10% to 60%, as compared to a solid sheet of the same geometry and size formed from the same polymeric material; and wherein the sheet, at a thickness of 1.0 mm, passes at least one of the following heat release requirements: 1) has a two minute integrated heat release rate of less than or equal to 65 kilowatt-minutes per square meter and a peak heat release rate of less than 65 kilowatts per square meter according to Part IV, OSU Heat Release of FAR/JAR 25.853, Amendment 25-116; 2) has a maximum averaged rate of heat emission (MARHE) of less than or equal to 90 kW/m$^2$ with 50 kW/m$^2$ irradiance level test condition according to ISO 5660-1; wherein the sheet, at the thickness of 1.0 mm, has a smoke density of less than or equal to 200 particles after four minutes of burning according to ASTM E662-06; and wherein the sheet is thermoformable.

In an embodiment, a method of making the sheet can comprise: melting the polymeric material to form a melt; combining the melt and a chemical blowing agent to form a mixture; neutralizing counterions produced by the blowing agent; nucleating bubbles in the mixture to produce cells; and forming the mixture into a sheet comprising an expanded core layer.

These and other features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
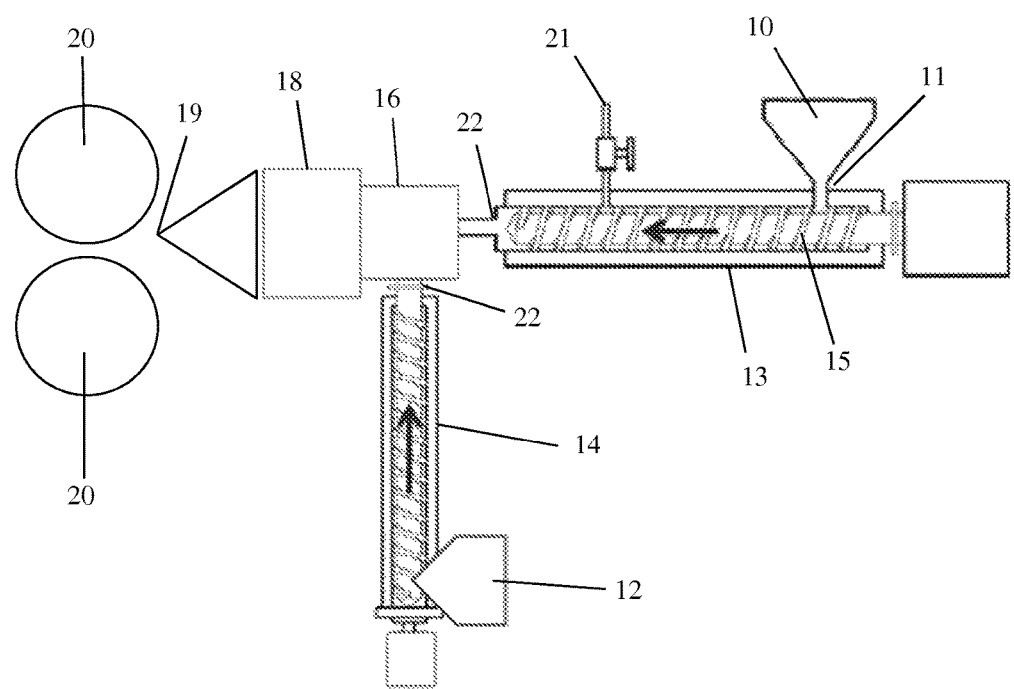
FIG. 1 is a schematic of a continuous process for producing a lightweight polymeric sheet.

Disclosed herein, in various embodiments, are lightweight, structural polymeric sheets comprising a core layer polymeric material having a glass transition temperature of greater than or equal to 100° C. The lightweight polymeric sheets have a lower density than a solid sheet (e.g., a sheet that has not been foamed), but a high enough density to be subsequently thermoformable after processing through an extruder. For example, the lightweight polymeric sheets can be subsequently formed into complex shapes via thermoforming and at the same time, can provide the added benefit of significant weight reduction compared to solid sheets. The core layer can be foamed, contributing to the weight reduction compared to solid sheets. The lightweight polymeric sheets can be thermoformed using deep draw methods. The lightweight polymeric sheets can be used in various applications, including, but not limited to, aircraft interior components, luggage, sheds, garages, various transportation applications including tractor truck trailer skirts, wind deflectors, and panels on trucks, walls, floors, signs, etc. The lightweight polymeric sheets can additionally comprise optional cap layer(s) on one or both sides, to provide increased rigidity to the sheets as well as consistent color and surface appearance. Further optionally, a film can be laminated to a surface of the lightweight polymeric sheet. The lightweight polymeric sheets can also, optionally, be imprinted on one or both surfaces to provide aesthetic surfaces if desired. Texture can also, optionally, be imprinted on one or both surfaces of the lightweight polymeric sheet for aesthetic surfaces by using a textured roll during cooling calendering operation.

Thermoforming is a manufacturing process where a plastic sheet is heated to a pliable forming temperature which is typically above the glass transition temperature of the plastic sheet, the sheet is then formed to a specific shape of a mold (of different geometry than the original plastic sheet) with vacuum assist, pressure assist or both, and trimmed to create a usable product. A thermoformable sheet means that the sheet can be thermoformed into the mold shape without mechanical failure of the sheet during the thermoforming process (e.g., without cracking, tearing, or other mechanical failure).

Self-texturing may occur due to the microcells under the surface of the caplayer, or if no caplayer, the part itself. The distribution of the microcells e.g., size, shape, and frequency are controlled to effect the self-texturing feature. The self-texture may be a stand-alone feature or used in combination with a purposefully applied texture with a calendering roller. The self-texturing feature does not get reduced after thermoforming, which is a common problem with imprinted textures that are heated up to thermoform temperatures typically in the range of 160° C. to 185° C. The surface roughness (Ra) of the self-texturing part can be from 0.076 micron (μm) to 30.48 μm, specifically range is 10.16 μm to 15.24 μm, for lower gloss applications. Gloss can be in the range of 2 to 90 gloss units (g.u.), generally less than 50 g.u., and specifically less than 20 g.u., and most specifically less than 10 g.u. as measured at 60 degrees using ATSM DS2457-08e1 and a BYK Gardner Gloss Meter.

Weight (wt) reductions of 5% to 60% can be achieved with the lightweight polymeric sheets disclosed herein, specifically, 10% to 60%, more specifically, 25% to 50%, and even more specifically, 30% to 40% weight reductions can be achieved as compared to a solid sheet of the same size and polymeric material (i.e., a solid sheet of the same composition but without any blowing agent or nucleation agent). For example, the density of the lightweight polymeric sheet can be greater than 0.61 grams per cubic centimeter (g/cm$^3$), specifically, greater than or equal to 0.61 g/cm$^3$ to 1.0 g/cm$^3$, more specifically, 0.65 g/cm$^3$ to 0.97 g/cm$^3$, still more specifically, 0.7 g/cm$^3$ to 0.95 g/cm$^3$, and even more specifically, 0.75 g/cm$^3$ to 0.90 g/cm$^3$. The lightweight polymeric sheets having the densities disclosed herein can pass aircraft interior and toxicity tests as described herein, while simultaneously offering a lower weight compared to a solid sheet. A cap layer can optionally be co-extruded with the core layer to provide a multilayer lightweight sheet and an aesthetic surface. The optional cap layer(s) can also be co-extruded with the use of chemical blowing agents and used with a solid core layer. The use of co-extrusion can offer many advantages over other processing methods including, but not limited to, higher forming efficiency, higher sheet rigidity, higher color control, easy use of recycle, and additional texturing options. Different rheological characteristics (e.g., greatly different viscosities) between the core layer and the cap layer can cause forming issues such as corrugations present on the sheet or edge waviness on the sheet. If using materials with different rheological characteristics for the core layer and the cap layer, use of a circular die during co-extrusion can eliminate these problems and can also help retain a spherical shape to cells in the lightweight core layer. Alternatively, a multi-manifold die may be used to independently control extrusion temperatures of the cap and core layers.

During processing of the lightweight polymeric sheets, when foaming a core layer or cap layer, a blowing agent can be added to the resin feed during polymer extrusion. Upon heating, the blowing agent decomposes and releases gas that eventually exits the extruder as bubbles dispersed in the polymer melt (e.g., sodium bicarbonate used as a blowing agent releases carbon dioxide as a gas). The resulting melt can then pass through a series of cooling rolls to produce a lightweight polymeric sheet with a lower density than a solid polymeric sheet. Additional processing steps at the cooling rolls include texturing, embossing, laminating, etc. As mentioned, the lightweight polymeric sheets disclosed herein can provide a 10% to 60% weight reduction as compared to solid polymeric sheets.

The lightweight polymeric sheets disclosed herein can be employed in a variety of aircraft and rail compartment interior applications, as well as interior applications for other modes of transportation, such as bus, train, subway, and the like. Exemplary aircraft interior components can include, without limitation, partition walls, cabinet walls, sidewall panels, ceiling panels, floor panels, equipment panels, light panels, window moldings, window slides, storage compartments, galley surfaces, equipment housings, seat housings, speaker housings, duct housing, storage housings, shelves, trays, and the like. The same applies to rail applications. It is generally noted that the overall size, shape, thickness, optical properties, electrical properties, and the like of the lightweight polymeric sheets disclosed herein can vary depending upon the desired application.

Rail interior applications in Europe typically require the material or articles made therefrom meet the EN45545 standard, which requires the material or articles to pass the smoke density test according to the standard set forth by International Standards Organization (ISO) 5659-2:2003, the heat release test according to ISO 5660-1, and the flame spread test set forth in ISO 5658-2. For rail applications, three hazard levels are present in the tests, which set forth the specification limits for the smoke density and heat release tests. For purposes of this application, the specification hazard level too was considered, which sets a limit on the smoke density (Ds @ 4 minutes) of less than 300 particles and a limit on the heat release (Maximum Average Heat Release (MAHRE) (MAHRE kilowatt (kW) @50 kW)) of less than 90 kiloWatts per square meter (kW/m$^2$). Specific optical density (i.e., Ds) is a dimensionless measure of the amount of smoke produced per unit area by a material when it is burned. The National Bureau of Standards (NBS) Smoke Density test conducted per 14 C.F.R. § 25.853 measures the maximum value of Ds that occurs during the first 4 minutes of the test. Examples of such materials meeting various rail standards include the H6000-series sheet products, standard and light weight forms, from SABIC Innovative Plastics Business.

Lightweight sheet products manufactured using Lexan* FST resin(s) supplied by SABIC's Innovative Plastics Business were tested for compliance to aircraft smoke density for interior applications. For aircraft applications, the material or article should be able to meet the requirements set forth by the American Society for Testing and Materials (ASTM) standard E662 (2006). A composition satisfying the smoke generation requirements for aircraft compartment interiors means a composition which meets the specification limits set forth in ASTM E662 (2006). This test method uses a photometric scale to measure the density of smoke generated by the material. Lightweight polymeric sheets satisfying the smoke generation requirements for aircraft interiors have a smoke density of less than 200 particles, in accordance with ASTM E662-06. While the tests described were chosen to show the ability of the lightweight polymeric sheets described herein to satisfy both the smoke generation and flammability requirements for aircraft interiors, the sheets can advantageously comply with other related flammability and safety tests. Examples of other such tests can include, without limitation, FR-1 tests, such as NF P 92-505, the ADB0031 test set forth by the aircraft manufacturer Airbus, FAR 25.853, toxicity tests, and the heat release test OSU 65/65 promulgated by the aircraft manufacturer Boeing.

In some interior compartment applications, it can be desirable for the lightweight polymeric sheet to have certain optical properties. For example, it can be desirable to have a transparent sheet, translucent sheet, or an opaque sheet. An opaque sheet generally refers to a sheet that has less than or equal to 3% light transmission, specifically, less than or equal to 1% light transmission, more specifically, less than or equal to 0.5% light transmission, and even more specifically, less than or equal to 0.25% light transmission. With regards to the transparency or opacity of the multilayer sheet, it is briefly noted that end user specifications (e.g., commercial airline specifications or commercial rail applications) generally specify that the component satisfy a particular predetermined threshold. Haze values, as measured by ANSI/ASTM D1003-00, can be a useful determination of the optical properties of the transparent flame retardant polycarbonate sheet. The lower the haze levels, the higher the light transmission value of the finished sheet. Haze can be measured using ASTM D1003-00, procedure B, using CIE (International Commission on Illumination) standard illuminant C. Translucent lightweight sheet would be defined a condition whereby light can pass through the sample; and transparent would be a subset of translucent whereby an optical image may also pass through the sheet with the light. Flame retardant additives, e.g. sodium p-toluene sulfonate, can have an impact on the haze of the final polymeric sheet. Therefore, it can be desirable to monitor the haze levels of the sheet along with flammability and smoke generation properties in order to produce an article that satisfies both safety and aesthetic quality specifications.

An additional beneficial feature of lightweight polymeric sheets manufactured in the described process is inherently lower thermal conductivity as compared to solid sheet of the same thickness. Thermal conductivity characterizes the heat transfer through the lightweight polymeric sheet as measured in watts per square meter kelvin ($W/m^2K$). More specifically, the U value is the amount of thermal energy that passes across one square meter of the low density sheet at a temperature difference between both sides of the sheet and is commonly referred to as thermal insulation or thermal conductivity.

As previously mentioned, the lightweight polymeric sheets described herein can comprise a core layer and an optional cap layer(s). The core layer and optional cap layer(s) can comprise the same or different materials. The core layer and/or cap layer(s) can comprise a plastic material, such as polymeric resins, thermosets, and combinations comprising at least one of the foregoing. Possible polymeric resins that may be employed include, but are not limited to, oligomers, polymers, ionomers, dendrimers, copolymers such as graft copolymers, block copolymers (e.g., star block copolymers, random copolymers, etc.) and combinations comprising at least one of the foregoing. Examples of such polymeric resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-styrene-butadiene (ABS), polyalkylmethacrylates (e.g., polymethylmethacrylates), polyesters (e.g., copolyesters, polythioesters), polyolefins (e.g., polypropylenes and polyethylenes, high density polyethylenes, low density polyethylenes, linear low density polyethylenes), polyamides (e.g., polyamideimides), polyarylates, polysulfones (e.g., polyarylsulfones, polysulfonamides), polyphenylene sulfides, polytetrafluoroethylenes, polyethers (e.g., polyether ketones, polyether etherketones, polyethersulfones), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazzanes, polysiloxanes, and combinations comprising at least one of the foregoing.

More particularly, the polymeric material used in the core layer and/or the cap layer can include, but is not limited to, polycarbonate resins (e.g., LEXAN™ resins, commercially available from SABIC's Innovative Plastics business such as LEXAN™ XHT, LEXAN™ HFD, etc.), polyphenylene ether-polystyrene blends (e.g., NORYL™ resins, commercially available from SABIC's Innovative Plastics business), polyetherimide resins (e.g., ULTEM™ resins, commercially available from SABIC's Innovative Plastics business), polybutylene terephthalate-polycarbonate blends (e.g., XENOY™ resins, commercially available from SABIC's Innovative Plastics business), copolyestercarbonate resins (e.g. LEXAN™ SLX or LEXAN™ FST resins, commercially available from SABIC's Innovative Plastics business), acrylonitrile butadiene styrene resins (e.g., CYCOLOY™ resins, commercially available from SABIC's Innovative Plastics business), polyetherimide/siloxane resins (e.g., SILTEM™, commercially available from SABIC's Innovative Plastics business) and combinations comprising at least one of the foregoing resins. Even more particularly, the polymeric resins can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can comprise copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate) blends of PC, such as PC/ABS blend, and combinations comprising at least one of the foregoing, for example a combination of branched and linear polycarbonate.

The core and/or cap layer(s) of the polymeric lightweight sheet can, optionally, include various additives ordinarily incorporated into polymer compositions of this type, with the proviso that the additive(s) are selected so as to not significantly adversely affect the desired properties of the sheet, in particular, flame retardance, smoke density, smoke toxicity, heat release, thermoformability, adhesion after thermoforming; hydrothermal resistance, water vapor transmission resistance, puncture resistance, and thermal shrinkage. Such additives can be mixed at a suitable time during the mixing of the components for forming the compositions of the core and cap layer(s). Exemplary additives include impact modifiers, fillers, reinforcing agents, antioxidants, heat stabilizers, light stabilizers, ultraviolet (UV) light stabilizers, plasticizers, lubricants, mold release agents, anti-static agents, colorants (such as carbon black and organic dyes), surface effect additives, radiation stabilizers (e.g., infrared absorbing), flame retardants, and anti-drip agents. A combination of additives can be used, for example a combination of a flame retardant heat stabilizer, mold release agent, and ultraviolet light stabilizer. In general, the additives can be used in the amounts generally known to be effective. The total amount of additives (other than any impact modifier, filler, or reinforcing agents) can generally be 0.001 to 5 weight percent (wt. %), based on the total weight of the composition of the particular layer. The core layer and/or the cap layer(s) can also optionally, additionally, comprise a flame retardant. Flame retardants include organic and/or inorganic materials. Organic compounds include, for example, phosphorus, sulphonates, and/or halogenated materials (e.g., comprising bromine chlorine, and so forth, such as brominated polycarbonate). Non-brominated and non-chlorinated phosphorus-containing flame retardant additives can be preferred in certain applications for regulatory reasons, for example organic phosphates and organic compounds containing phosphorus-nitrogen bonds.

Inorganic flame retardants include, for example, $C_{1-16}$ alkyl sulfonate salts such as potassium perfluorobutane sulfonate (Rimar salt), potassium perfluoroctane sulfonate, tetraethyl ammonium perfluorohexane sulfonate, and potassium diphenylsulfone sulfonate (e.g., KSS); salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 1 parts by weight, more specifically 0.02 to 0.5 parts by weight, based on 100 parts by weight of the total composition of the layer of the multilayer sheet in which it is included (i.e., the core layer), excluding any filler.

Anti-drip agents can also be used in the composition forming the core layer or cap layer(s), for example a fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. An exemplary TSAN comprises 50 wt. % PTFE and 50 wt. % SAN, based on the total weight of the encapsulated fluoropolymer. The SAN can comprise, for example, 75 wt. % styrene and 25 wt. % acrylonitrile based on the total weight of the copolymer. Anti-drip agents can be used in amounts of 0.1 to 1 parts by weight, based on 100 parts by weight of the total composition of the particular layer, excluding any filler.

As used herein, the term "polycarbonate" means compositions having repeating structural carbonate units of formula (1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula $HO—R^1—OH$, in particular of formula (2)

$$HO-A^1-Y^1-A^2-OH \qquad (2)$$

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (3)

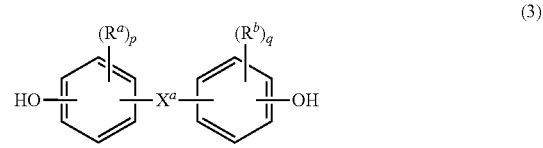

wherein $R^a$ and $R^b$ each represent a halogen or $C_{1-12}$ alkyl group and can be the same or different; and p and q are each independently integers of 0 to 4. It will be understood that $R^a$ is hydrogen when p is 0, and likewise $R^b$ is hydrogen when q is 0. Also in formula (3), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q are each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

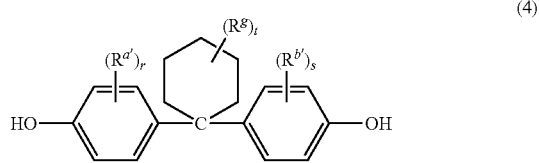

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$, and $R^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

$X^a$ can also be a substituted $C_{3-18}$ cycloalkylidene of formula (5)

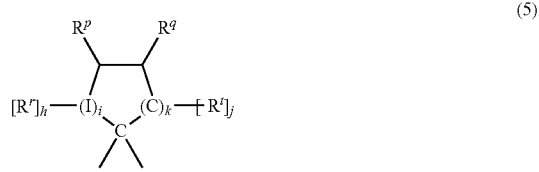

(5)

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is 1 and i is 0, the ring as shown in formula (5) contains 4 carbon atoms, when k is 2, the ring as shown in formula (5) contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful aromatic dihydroxy compounds of the formula HO—$R^1$—OH include compounds of formula (6)

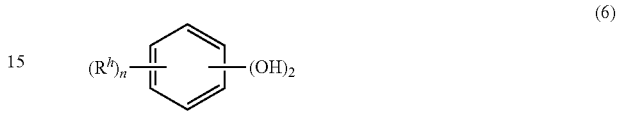

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl) sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-2-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (p,p-PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The homopolymer of DMBPC carbonate, which is represented by the x portion of formula (7) or its copolymer with BPA carbonate has an overall chemical structure represented by formula (7)

polyester unit, in addition to an optional recurring carbonate chain units of the formula (1). As disclosed herein, polyester units or polymers comprise repeating ester units of formula (8):

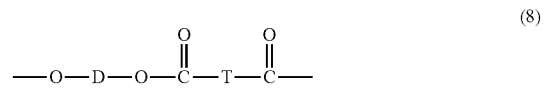

wherein D is a divalent group derived from a dihydroxy compound, and may be, for example, a $C_{6-20}$ alicyclic group or a $C_{6-20}$ aromatic group; and T is a divalent group derived from a dicarboxylic acid, and may be, for example, a $C_{6-20}$ alicyclic group, a $C_{6-20}$ alkylene-arylene group, or a $C_{6-20}$ arylene group. In a specific embodiment, T is a $C_{6-20}$ arylene group. In an embodiment, D is derived from a dihydroxy aromatic compound comprising formula (2), formula (3), formula (4), formula (6), or a combination comprising at least one of the foregoing dihydroxy aromatic compounds. The D and T groups are desirably minimally substituted with hydrocarbon-containing substituents such as alkyl, alkoxy, or alkylene substituents. In an embodiment, less than 5 mol %, specifically less than or equal to 2 mol %, and still more specifically less than or equal to 1 mol % of the combined

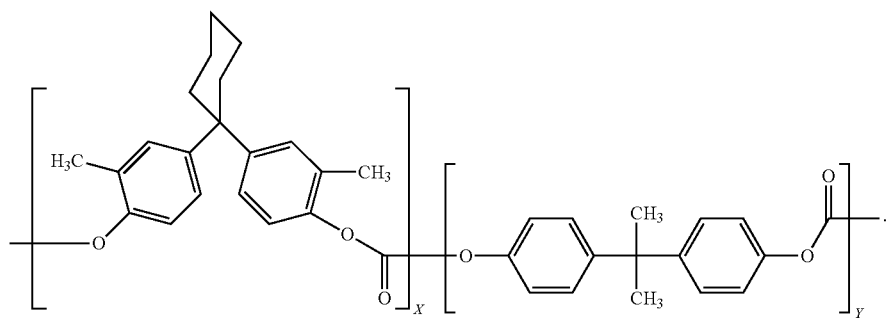

DMBPC carbonate can be co-polymerized with BPA carbonate to form a DMBPC BPA co-polycarbonate. For example, DMBPC based polycarbonate as a copolymer or homopolymer (DMBPC) can comprise 10 to 100 mol % DMBPC carbonate and 90 to 0 mol % BPA carbonate.

The method of making any of the polycarbonates herein described is not particularly limited. It may be produced by any known method of producing polycarbonate including the interfacial process using phosgene and/or the melt process using a diaryl carbonate, such as diphenyl carbonate or bismethyl salicyl carbonate, as the carbonate source.

"Polycarbonates" as used herein further include homopolycarbonates, (wherein each $R^1$ in the polymer is the same), copolymers comprising different $R^1$ moieties in the carbonate (referred to herein as "copolycarbonates"), copolymers comprising carbonate units and other types of polymer units, such as ester units, and combinations comprising at least one of homopolycarbonates and/or copolycarbonates. As used herein, a "combination" is inclusive of blends, mixtures, alloys, reaction products, and the like.

For example, a polycarbonate-polysiloxane copolymer can be utilized in the core and/or cap layer(s). The polycarbonate-polysiloxane copolymer composition can comprise a number of moles of D and T groups are substituted with hydrocarbon-containing substituents such as alkyl, alkoxy, or alkylene substituents.

Examples of aromatic dicarboxylic acids from which the T group in the ester unit of formula (8) is derived include isophthalic or terephthalic acid, 1,2-di(p-carboxyphenyl) ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 99:1 to 1:99.

In an embodiment, the arylate ester units of the arylate-containing units are derived from the reaction product of one equivalent of an isophthalic acid derivative and/or terephthalic acid derivative. In such an embodiment, the arylate units are as illustrated in formula (9):

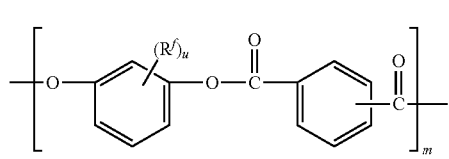

(9)

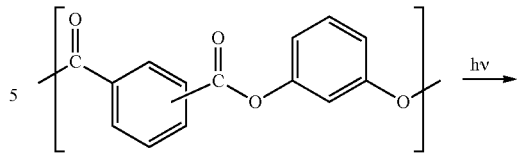

(10)

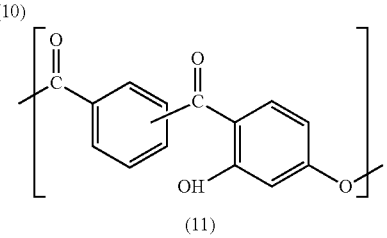

(11)

wherein $R^f$ and u are previously defined for formula (6), and m is greater than or equal to 4. In an embodiment, m is 4 to 50, specifically 5 to 30, more specifically 5 to 25, and still more specifically 10 to 20. Also in an embodiment, m is less than or equal to 100, specifically less than or equal to 90, more specifically less than or equal to 70, and still more specifically less than or equal to 50. It will be understood that the low and high endpoint values for m are independently combinable. In another embodiment, the molar ratio of isophthalate to terephthalate can be about 0.25:1 to about 4.0:1. In a specific embodiment, the arylate ester units consist of isophthalate-terephthalate ester units. In another embodiment, the arylate ester units are derived from the reaction product of one equivalent of an isophthalic acid derivative and/or a terephthalic acid derivative with a resorcinol of formula (6). Such arylate ester units correspond to formula (14) below wherein $R^1$ is derived from resorcinol.

Exemplary arylate ester units are aromatic polyester units such as isophthalate-terephthalate-resorcinol ester units, isophthalate-terephthalate-bisphenol ester units, or a combination comprising each of these. Specific arylate ester units include poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)] ester, or a combination comprising at least one of these. In an embodiment, a useful arylate ester unit is a poly(isophthalate-terephthalate-resorcinol) ester. In an embodiment, the arylate ester unit comprises isophthalate-terephthalate-resorcinol ester units in an amount greater than or equal to 95 mol %, specifically greater than or equal to 99 mol %, and still more specifically greater than or equal to 99.5 mol % based on the total number of moles of ester units in the polyarylate unit. In another embodiment, the arylate ester units are not substituted with non-aromatic hydrocarbon-containing substituents such as, for example, alkyl, alkoxy, or alkylene substituents.

In one embodiment, polysiloxane copolymer compositions as disclosed herein are weatherable compositions comprising isophthalate-terephthalate-resorcinol ester units. Exposure of isophthalate-terephthalate esters such as (10) to ultraviolet radiation can cause a rapid, photochemically-induced rearrangement known as a Photo-Fries rearrangement, to form the 2-hydroxy benzophenone of formula (11) at the surface, which acts as an ultraviolet absorber and stabilizer for the underlying polymer. Compositions comprising resorcinol ester units thus also undergo only a slow Photo-Fries rearrangement below the surface of the composition, and so are both resistant to weathering and are suitable for use in the polymeric compositions disclosed herein.

Other ester units, such as bisphenol-containing ester units of formula (12), also undergo Photo-Fries rearrangement to form the corresponding 2-hydroxy benzophenone having formula (13). Because of the electronic structure of these species, there is a greater absorption of light at a wavelength of about 400 nm. As a result, the transmitted or reflected light has an observable and undesirable more yellow color than other structures such as the structure represented by formula (11), measurable by yellowing index ("YI"). Thus, for weatherable applications, it is further desirable to minimize the number of bisphenol ester units present in such resins and articles derived therefrom.

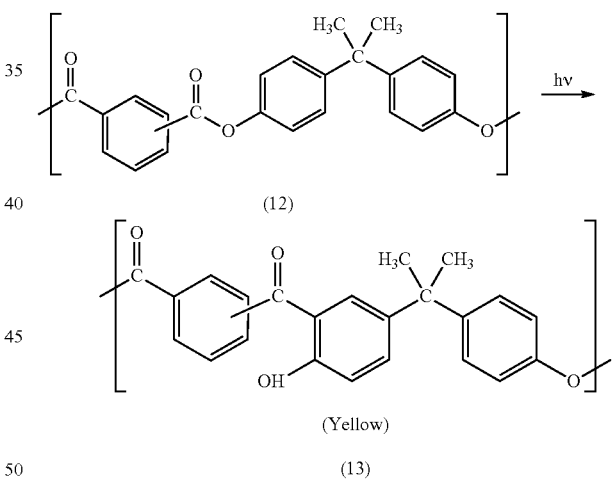

(12)

(Yellow)

(13)

In an embodiment, the arylate ester units are polyester-polycarbonate units having the structure shown in formula (14):

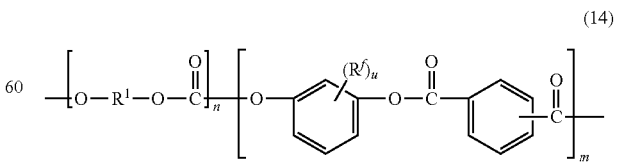

(14)

wherein $R^f$, u, and m are as defined in formula (9), each $R^1$ is independently a $C_{6-30}$ arylene group, and n is greater than or equal to one. In an embodiment, n is from 3 to 50, specifically from 5 to 25, and more specifically from 5 to 20. Also, in an embodiment, n is less than or equal to 50, specifically less than or equal to 25, and more specifically less than or equal to 20. It will be understood that the endpoint values for n are independently combinable. In an embodiment, m is from 5 to 75, specifically from 5 to 30, and more specifically from 10 to 25. In a specific embodiment, m is 5 to 75, and n is 3 to 50. In a specific embodiment, m is 10 to 25, and n is 5 to 20. In an embodiment, the polyester-polycarbonate unit is the reaction product of a combination of isophthalic and terephthalic diacids (or derivatives thereof) with a dihydroxy compound of formula (6), wherein the molar ratio of isophthalate units to terephthalate units is 99:1 to 1:99, specifically 95:5 to 5:95, more specifically 90:10 to 10:90, and still more specifically 80:20 to 20:80. In an embodiment, the molar ratio of the isophthalate-terephthalate ester units to the carbonate units in the polyester-polycarbonate can be 1:99 to 99:1, specifically 5:95 to 90:10, more specifically 10:90 to 80:20.

In a specific embodiment, the polyester polycarbonate unit comprises resorcinol carbonate units, derived from resorcinols of formula (6), and having formula (15):

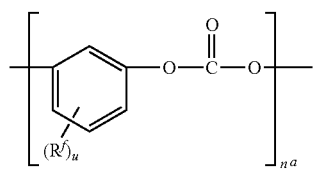

(15)

wherein $R^f$ and u are as described above, and $n^a$ is greater than or equal to 1. In another embodiment, a polyester-polycarbonate unit further comprises bisphenol carbonate units derived from bisphenols of formulas (3) and (4), having formula (16)

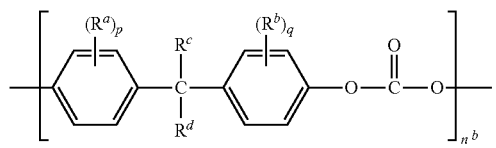

(16)

wherein $R^a$ and $R^b$ are each individually $C_{1-8}$ alkyl, $R^c$ and $R^d$ are individually $C_{1-8}$ alkyl or $C_{1-8}$ cycloalkylene, p and q are 0 to 4, and $n^b$ is greater than or equal to one. In another embodiment, the polyester-polycarbonate unit comprises resorcinol carbonate units of formula (15) and bisphenol carbonate units of formula (16), in a molar ratio of resorcinol carbonate units to bisphenol carbonate units of 1:99 to 100:0. In a specific embodiment, the polyester-polycarbonate units are derived from resorcinol (i.e., 1,3-dihydroxybenzene) or a combination comprising resorcinol and bisphenol-A. In a specific embodiment, the polyester-polycarbonate unit is a poly(isophthalate-terephthalate-resorcinol ester)-co-(resorcinol carbonate)-co-(bisphenol-A carbonate) polymer.

The polysiloxane copolymer composition desirably comprises a minimum amount of saturated hydrocarbon present in the form of substituents or structural groups such as bridging groups or other connective groups. In another embodiment, less than or equal to 25 mol %, specifically less than or equal to 15 mol %, and still more specifically less than or equal to 10 mol % of the combined arylate ester units and carbonate units comprise alkyl, alkoxy, or alkylene groups. In a specific embodiment, where the polysiloxane copolymer composition comprises carbonate units, less than or equal to 25 mol %, specifically less than or equal to 15 mol %, and still more specifically less than or equal to 10 mol % of the carbonate units comprising alkyl, alkoxy, or alkylene groups, based on the combined moles of arylate ester units and carbonate units. In another embodiment, the arylate ester units and the carbonate units are not substituted with non-aromatic hydrocarbon-containing substituents such as, for example, alkyl, alkoxy, or alkylene substituents.

In an embodiment, the arylate-containing units of the polysiloxane copolymer composition consist of 50 to 100 mole percent (mol %) of arylate ester units, specifically 58 to 90 mol % arylate ester units; 0 to 50 mol % aromatic carbonate units (e.g., resorcinol carbonate units, bisphenol carbonate units and other carbonate units such as aliphatic carbonate units); 0 to 30 mol % resorcinol carbonate units, specifically 5 to 20 mol % resorcinol carbonate units; and 0 to 35 mol % bisphenol carbonate units, specifically 5 to 35 mol % bisphenol carbonate units.

In an exemplary embodiment, the arylate-containing unit is a polyester-polycarbonate unit that may have a weight average molecular weight ($M_w$) of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a crosslinked styrene-divinyl benzene column, at a sample concentration of 1 milligram per milliliter, and as calibrated with polycarbonate standards. Samples are eluted at a flow rate of about 1.0 ml/min with methylene chloride as the eluent.

The polysiloxane copolymer composition further comprises a polysiloxane (also referred to herein as "polydiorganosiloxane") unit, in addition to the arylate-containing units. Polysiloxane units comprise repeating siloxane units (also referred to herein as "diorganosiloxane units") of formula (17):

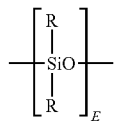

(17)

wherein each occurrence of R is the same or different, and is a $C_{1-13}$ monovalent organic group. For example, R may independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups may be fully or partially halogenated with fluorine, chlorine, bromine, or iodine, or a combination thereof. Combinations of the foregoing R groups may be used in the same copolymer. In an embodiment, the polysiloxane comprises R groups that have a minimum hydrocarbon content. In a specific embodiment, an R group with a minimum hydrocarbon content is a methyl group.

The value of E in formula (17) may vary widely depending on the type and relative amount of each component in the polymeric composition, the desired properties of the composition, and like considerations. Herein, E has an average value of 4 to 50. In an embodiment, E has an average value of 16 to 50, specifically 20 to 45, and more specifically 25 to 45. In another embodiment, E has an average value of 4 to 15, specifically 5 to 15, more specifically 6 to 15, and still more specifically 7 to 10.

In an embodiment, the polydiorganosiloxane units are provided by repeating structural units of formula (18):

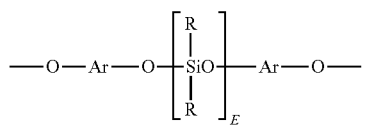

(18)

wherein E is as defined above; each R may independently be the same or different, and is as defined above; and each Ar may independently be the same or different, and is a substituted or unsubstituted $C_{6-30}$ arylene group, wherein the bonds are directly connected to an aromatic moiety. Suitable Ar groups in formula (18) may be derived from a $C_{6-30}$ dihydroxy aromatic compound, for example a dihydroxy aromatic compound of formula (2), (3), (4), or (6) above. Combinations comprising at least one of the foregoing dihydroxy aromatic compounds may also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds may also be used. In an embodiment, the dihydroxy aromatic compound is unsubstituted, or is not substituted with non-aromatic hydrocarbon-containing substituents such as, for example, alkyl, alkoxy, or alkylene substituents.

Units of formula (18) may be derived from the corresponding dihydroxy aromatic compound of formula (19):

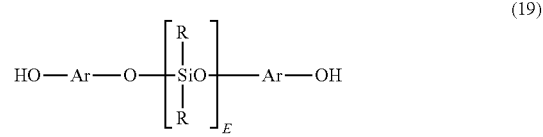

(19)

wherein R, Ar, and E are as described above. In a specific embodiment, where Ar is derived from resorcinol, the polysiloxane has formula (20):

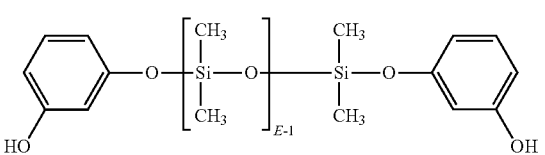

(20)

or, where Ar is derived from bisphenol-A, the polysiloxane has the formula (21)

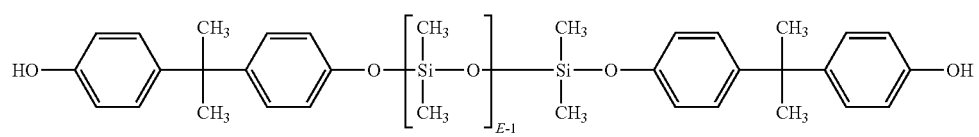

(21)

where E for formulas (20) and (21) are as defined for formula (17), above.

In another embodiment, polydiorganosiloxane units are units of formula (22):

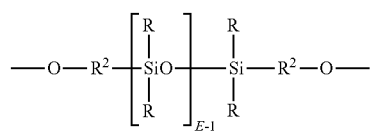

(22)

wherein R and E are as described for formula (17), and each occurrence of $R^2$ is independently a divalent $C_{1-30}$ alkylene or $C_{7-30}$ arylene-alkylene, and wherein the polymerized polysiloxane unit is the reaction residue of its corresponding dihydroxy aromatic compound. In a specific embodiment, where $R^2$ is $C_{7-30}$ arylene-alkylene, the polydiorganosiloxane units are of formula (23):

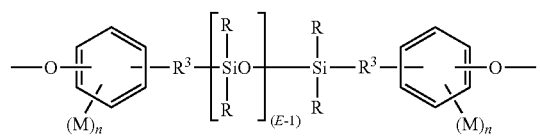

(23)

wherein R and E are as defined for formula (17). Each $R^3$ in formula (23) is independently a divalent $C_{2-8}$ aliphatic group. Each M in formula (23) may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

Units of formula (23) may be derived from the corresponding dihydroxy polydiorganosiloxanes (24):

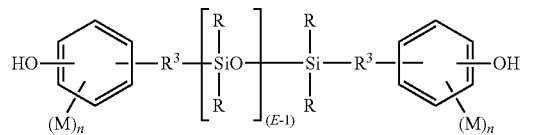

(24)

wherein R, E, M, $R^3$, and n are as described for formula (23).

In a specific embodiment, the dihydroxy oligodiorganosiloxane has the structure given in formula (25):

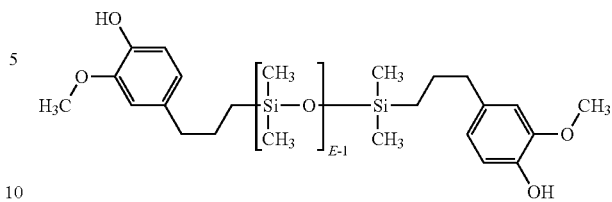

(25)

where E is as described for formula (17), above.

In another specific embodiment, the polydiorganosiloxane units are derived from dihydroxy oligodiorganosiloxanes of formula (26):

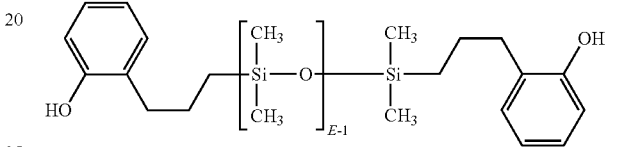

(26)

where E is as defined for formula (17), above.

In a specific embodiment, a hydroxyaromatic end-capped polysiloxane of general formula (21) (where Ar is derived from bisphenol-A) forms an ester-linked structure with a carboxylic acid derivative during formation of the polysiloxane copolymer composition, which has the structure of formula (27):

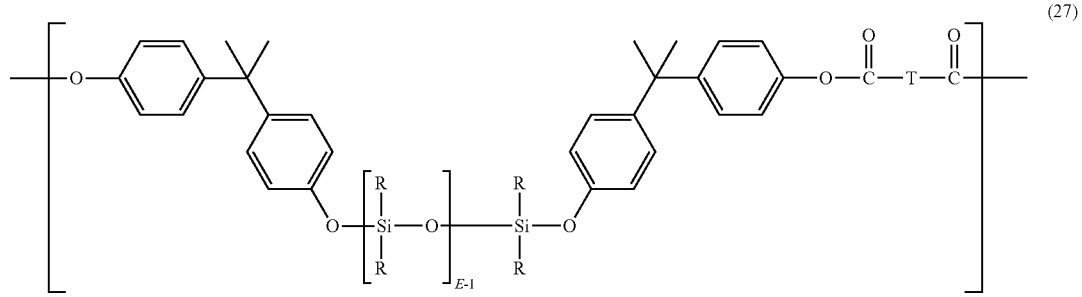

(27)

or, where a hydroxyaromatic end-capped polysiloxane of formula (21) (derived from a bisphenol) is copolymerized with a carbonate precursor or haloformate, a carbonate linked structure is formed in the polysiloxane copolymer composition, having the structure of formula (28):

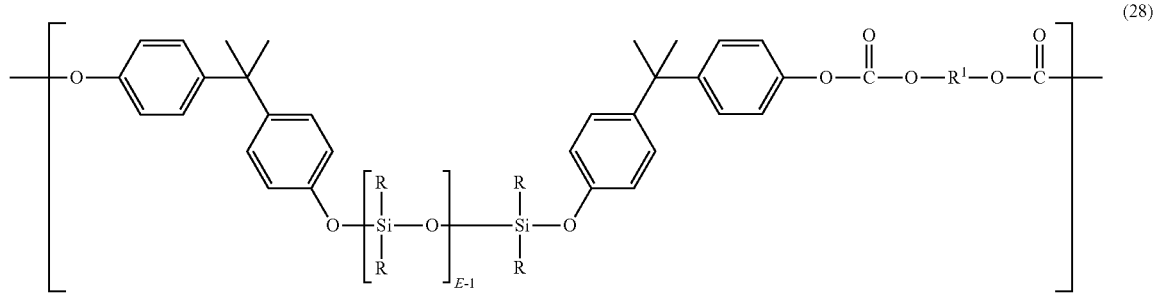

(28)

or a combination comprising the foregoing polysiloxanes, wherein for both formulas (27) and (28), R and E are as described for formula (17), above; T in formula (27) is a $C_{6-30}$ arylene group; and $R^1$ in formula (28) is a $C_{6-30}$ arylene group. In an embodiment, T is derived from the reaction product of a reactive derivative of isophthalic and/or terephthalic acid. In an embodiment, $R^1$ is derived from the carbonate reaction product of a resorcinol of formula (6), or a combination of a resorcinol of formula (6) and a bisphenol of formula (3).

In another specific embodiment, a hydroxyaromatic end-capped polysiloxane of general formula (19) (where Ar is derived from resorcinol) forms an ester-linked structure with a carboxylic acid derivative during formation of the polysiloxane copolymer composition, which has the structure of formula (29):

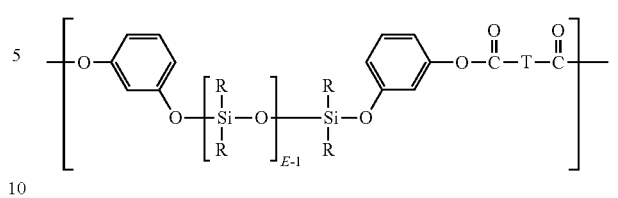

or, where a hydroxyaromatic end-capped polysiloxane of formula (20) (derived from a resorcinol) is copolymerized with a carbonate precursor or haloformate, a carbonate linked structure is formed in the polysiloxane copolymer composition, having the structure of formula (30):

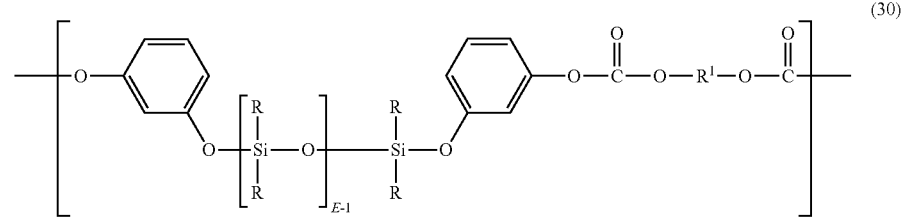

wherein for both formulas (29) and (30), R and E are as described for formula (17), above; T in formula (29) is a $C_{6-30}$ arylene group; and $R^1$ in Formula (30) is a $C_{6-30}$ arylene group. In an embodiment, T is derived from the reaction product of a reactive derivative of isophthalic and/or terephthalic acid. In an embodiment, $R^1$ is derived from the carbonate reaction product of a resorcinol of formula (6), or a combination of a resorcinol of formula (6) and a bisphenol of formula (3).

In another specific embodiment, a hydroxyaromatic end-capped polysiloxane of general formula (23) where $R^3$ is trimethylene can form an ester-linked structure with a carboxylic acid derivative during formation of the polysiloxane copolymer composition, which has the structure of formula (31):

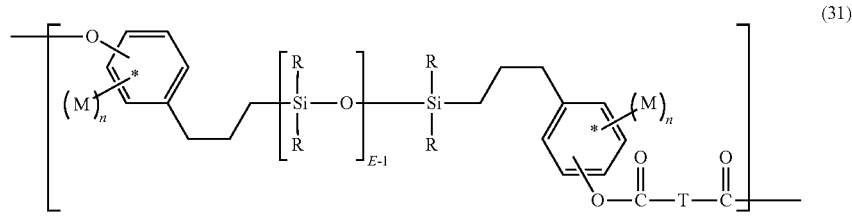

or, where a hydroxyaromatic end-capped polysiloxane of formula (23) (where $R^3$ is trimethylene) is copolymerized with a carbonate precursor or haloformate, a carbonate linked structure is formed in the polysiloxane copolymer composition, having the structure of formula (32):

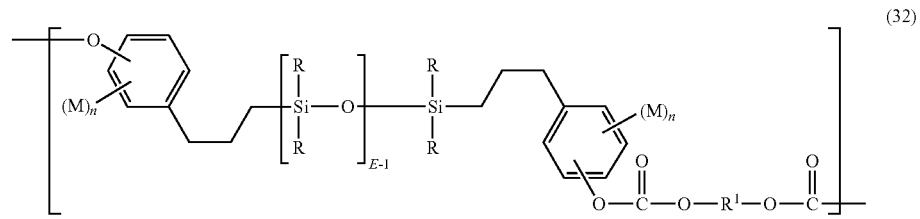

or a combination comprising these polysiloxanes, wherein for both formulas (31) and (32), R and E are as described for formula (17), M and n are as described for formula (23), above; T in formula (31) is a $C_{6-30}$ arylene group; and $R^1$ in Formula (32) is a $C_{6-30}$ arylene group. In an embodiment, T is derived from the reaction product of a reactive derivative of isophthalic and/or terephthalic acid. As in formula (23), the arylene portions of formulas (31) and (32) each have connectivity to both of: an oxygen atom, which provides connectivity to the adjacent arylate ester units and/or aromatic carbonate units and is derived from a hydroxy group; and the alkylene portion of the polysiloxane end group which further has connectivity to both the terminal silicon atom of the polysiloxane portion, and the arylene portion of the polysiloxane unit. In an embodiment, the oxygen atom and the alkylene group connecting the arylene portion to the terminal silicon atom of the polysiloxane unit may be disposed ortho, meta, or para to each other on the arylene portions of formulas (31) or (32). In an embodiment, $R^1$ is derived from the carbonate reaction product of a resorcinol of formula (6), or a combination of a resorcinol of formula (6) and a bisphenol of formula (3).

Dihydroxy polysiloxanes typically can be made by functionalizing a substituted siloxane oligomer of formula (33):

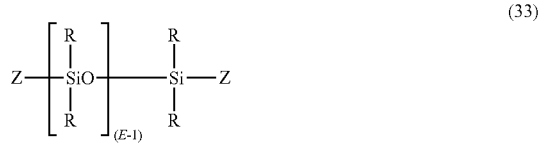
(33)

wherein R and E are as previously defined, and Z is H, halogen (Cl, Br, I), or carboxylate. Exemplary carboxylates include acetate, formate, benzoate, and the like. In an exemplary embodiment, where Z is H, compounds of formula (33) may be prepared by platinum catalyzed addition with an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-allylphenol, 2-methyl-4-propenylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising at least one of the foregoing may also be used. Where Z is halogen or carboxylate, functionalization may be accomplished by reaction with a dihydroxy aromatic compound of formulas (2), (3), (4), (6), or a combination comprising at least one of the foregoing dihydroxy aromatic compounds. In an exemplary embodiment, compounds of formula (19) may be formed from an alpha, omega-bisacetoxypolydiorangonosiloxane and a dihydroxy aromatic compound under phase transfer conditions.

In an embodiment, the polysiloxane copolymer composition comprises siloxane units in an amount of 0.5 to 20 mol %, specifically 1 to 10 mol % siloxane units, based on the combined mole percentages of siloxane units, arylate ester units, and carbonate units, and provided that siloxane units are provided by polysiloxane units covalently bonded in the polymer backbone of the polysiloxane copolymer composition.

The polysiloxane copolymer composition comprises siloxane units in an amount of 0.1 to 25 wt. %. In an embodiment, the polysiloxane copolymer composition comprises siloxane units in an amount of 0.2 to 10 wt. %, specifically 0.2 to 6 wt. %, more specifically 0.2 to 5 wt. %, and still more specifically 0.25 to 2 wt. %, based on the total weight of the polysiloxane copolymer composition, with the proviso that the siloxane units are provided by polysiloxane units covalently bonded in the polymer backbone of the polysiloxane copolymer composition.

The polysiloxane copolymer composition can further comprise carbonate units of formula (1). In an embodiment, the polysiloxane copolymer composition comprises 0.2 to 6 wt. % polysiloxane units, 50 to 99.8 wt. % ester units, and 0 to 49.85 wt. % carbonate units, wherein the combined weight percentages of the polysiloxane units, ester units, and carbonate units is 100 wt. % of the total weight of the polysiloxane copolymer composition. In another embodiment, the polysiloxane copolymer composition comprises 0.25 to 2 wt. % polysiloxane units, 60 to 94.75 wt. % ester units, and 3.25 to 39.75 wt. % carbonate units, wherein the combined weight percentages of the polysiloxane units, ester units, and carbonate units is 100 wt. % of the total weight of the polysiloxane copolymer composition.

In an embodiment, a polysiloxane copolymer composition described above has a $T_g$ of less than or equal to 165° C., specifically less than or equal to 160° C., and more specifically less than or equal to 155° C. Similarly, in an embodiment, a polysiloxane copolymer composition described above has a $T_g$ for the polycarbonate unit of greater than or equal to 115° C., specifically greater than or equal to 120° C.

The polysiloxane copolymers described herein can be manufactured by different methods such as, for example, solution polymerization, interfacial polymerization, and melt polymerization. Of these, a specifically useful method is interfacial polymerization. Although the reaction conditions for interfacial polymerization can vary, a process generally involves dissolving or dispersing a dihydric phenol reactant in aqueous caustic soda or potash, or alternatively suspending or dissolving a dihydric phenol reactant in water adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11.5. The most commonly used water immiscible solvents include methylene chloride, 1,2-dichloroethane, chlorobenzene, toluene, and the like. Exemplary carbonate precursors include, for example, a carbonyl halide such as carbonyl bromide or carbonyl chloride, or a haloformate such as a bishalofor-mates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Addition of polysiloxane units to polyester-polycarbonate compositions can increase the heat release rate performance of the resulting polysiloxane copolymer composition, where increasing amounts of polysiloxane-polycarbonate can provide increased heat release rate performance. However, the use of amounts of polysiloxane at concentrations of greater than 6 wt. % of the total weight of the polysiloxane in the composition can lead to undesirable haze levels and/or a deterioration of the heat release rate performance.

In addition, the size of the polysiloxane units may affect the haze and/or transparency of the polysiloxane copolymer composition. Units of a compositionally distinct composition in a copolymer, such as for example polysiloxane units in polycarbonate, polyester, or a combination, may order to form a large discrete phase in which the more ordered unit phase-separates from the surrounding polymeric matrix. These large, phase-separated domains can occur when either large units of polysiloxane (i.e., greater than 15 siloxane units), polyarylate units of greater than 30 arylate ester units, and/or polycarbonate units, are non-uniformly dispersed in the polymer chain. The units may thus form phase-separated regions (sometimes referred to herein as "domains"). A domain may be defined as a region within a surrounding matrix, having a discrete and observable boundary separating it from the surrounding matrix. The presence of specific domains of immiscible, phase-separated regions may be observed by appropriate analytical methods such as transmission electron microscopy (TEM). These phase-separated regions can vary greatly in size, but may typically have a long dimension of 20 to 200 nanometers or longer in contiguous length, with the length coincident with the direction of flow of the polymeric composition during extrusion or injection molding. It is believed that the presence of these phase-separated regions in the copolymer can scatter incident light. Increasing the size of the phase-separated regions, increasing the numbers of phase-separated regions, and increasing the intra-chain concentration of the phase-separating units, are each individually believed to correlate to increased scatter of incident light. The bulk properties of domain formation may therefore be observed using haze and/or light transmission measurements. Thus, absent a mechanism to prevent, reduce, mitigate, or eliminate the formation of these phase-separated regions, such domains may be observed to form where combinations of dissimilar, immiscible polymer units are used. Mechanisms for controlling the formation of domains include limiting unit size, limiting the concentration of units in the copolymer, and increasing the randomness and uniform spacing of the units distributed in the polycarbonate. Thus, smaller phase-separated regions and decreased numbers of phase-separated regions may decrease the amount of scattered incident light, and thereby decrease the measurable haze of the combination, and where desired, provide an increase in the light transmission.

Increasing the unit length, while maintaining the total weight of the polysiloxane as a percentage of the weight of the polysiloxane copolymer composition, results in decreased heat release rate performance in the OSU test. Increasing the polysiloxane unit length to a value greater than 15 results in lower heat release rate performance for compositions comprising polysiloxanes of different unit lengths, but having a constant total polysiloxane loading. The highest heat release rate performance is obtained with short polysiloxane unit lengths (less than or equal to 15 repeating units) at a given total loading of polysiloxane unit (as a weight percentage of the polysiloxane-polycarbonate). In this way, the distribution of higher numbers of short polysiloxane through the polymer matrix provides greater flame retrace and optimum transparency. The best ductility is obtained by using the largest siloxane units. For compositions requiring high toughness and good FR performance, larger siloxane units or a combination of large and small siloxane units can be used. For compositions requiring moderate levels of toughness with good FR, shorter siloxane units can be used.

It can therefore be desirable to have a unit size for the polysiloxane unit of the polysiloxane copolymer compositions that is of large enough size to ensure that the polysiloxane copolymer composition has an efficient heat release rate performance based on the distribution of polysiloxane, and that the units are small enough to not form domains of a size that can cause observable light scattering (i.e., haze). The units are also desirably present in sufficient concentration in the polysiloxane copolymer composition to provide the desired impact properties while maintaining the low haze. Further, it is desirable that the units are distributed sufficiently randomly and uniformly spaced throughout the polysiloxane copolymer composition for the above reasons of improved heat release rate performance and low haze.

A polysiloxane copolymer composition comprising low levels, e.g., less than or equal to 10 wt. %, specifically, less than or equal to 6 wt. %, of a polysiloxane unit 4 to 50 siloxane repeat units, specifically, greater than 15, and more specifically, greater than 25 distributed in the polyester unit, polycarbonate unit, or in both the polyester and polycarbonate units, can have a low heat release rate as determined by combustion of an article consisting of the polysiloxane copolymer composition. The polysiloxane copolymer composition with polysiloxane units can have improved intrinsic heat release properties when compared to polycarbonates, polyester-polycarbonates, and combinations comprising these. The polysiloxane copolymer composition further can have comparable or lower haze and comparable or improved transparency properties when compared to polyimides and polysiloxane-polyimides having good heat release properties. The polysiloxane copolymer composition with polysiloxane units has lower haze, lower color, and comparable or improved transparency properties when compared to polymers having good heat release properties but high haze and low transparency such as, for example, polyimides and polysiloxane-polyimides.

Further, the low haze of the polysiloxane copolymer composition with polysiloxane units provides for polymeric compositions having other desirable properties such as good weatherability and high gloss retention. Polyarylates have greater resistance to weathering by ultraviolet radiation and/or moisture in air that is superior to other impact modified, flame retardant compositions. It is believed that the use of the aforementioned polyarylate units to prepare polysiloxane copolymer compositions provides excellent weathering according to an appropriate weathering protocol, such as that according to ASTM G155-04a. Further, the weather resistance of the polyarylate units provides an improvement in transparency, yellowness (as measured by change in yellowness index after weathering), surface gloss after weathering, and resistance to formation of haze in the polysiloxane copolymer composition. In addition, the use of the polysiloxane units, dispersed through the polymer chain as described herein, provides desirable heat release rate performance, impact properties, and ductility while maintaining or improving the desired low haze and transparency.

Also a low loading of less than or equal to 0.25 weight percent of polysiloxane in the polysiloxane copolymer composition can provide the desired heat release properties, while maintaining the desired low haze. It will be understood by one skilled in the art that within such a limitation, combinations of parameters including polysiloxane unit size, number of polysiloxane units, distribution of polysiloxane units, and composition of the polysiloxane units, can also each be adjusted with respect to the other within the compositional parameters provided to achieve desirable haze and impact property performance from the polysiloxane copolymer composition. Compositions comprising the polysiloxane copolymer compositions disclosed herein can further have improved ductility, and lower melt viscosity at higher shear rates than other impact modified polycarbonates for improved melt-flow characteristics.

In order to attain the desired lightweight sheet, the polymeric composition of the core layer can also comprise blowing agent(s). The blowing agent(s) can be of the decomposition type (evolves a gas (e.g., carbon dioxide ($CO_2$), nitrogen ($N_2$), and/or ammonia gas) upon chemical decomposition), and/or an evaporation type (which vaporizes without chemical reaction). Possible blowing agents include, carbon dioxide, sodium bicarbonate, azide compounds, ammonium carbonate, ammonium nitrite, monosodium citrate, light metals which evolve hydrogen upon reaction with water, chlorinated hydrocarbons, chlorofluorocarbons, azodicarbonamide, N,N'dinitrosopentamethylenetetramine, trichloromonofluoromethane, trichlorotrifluoroethane, methylene chloride, organic carboxylic acids (such as formic acid, acetic acid, oxalic acid, ricinoleic acid, and so forth), pentane, butane, ethanol, acetone, nitrogen gas ($N_2$), ammonia gas, and so forth, as well as combinations comprising at least one of the foregoing. Exemplary commercial blowing agents useful for extrusion and molding include, but are not limited to, 6257 ID Endo Foam 35 XFC, 5767 ID Endo Foam 100FC, 8812 ID Exo Foam 80, 8861 ID 25, 6851 ID 35 MFC, 6400 ID 35 NA, 6295 ID 70 XFC, 6265 ID 70 MFC, 7800 ID 70 NA, 6905 ID 90 NA, 6906 ID 90 NA FC, 6258 ID 100 XFC 100, 6836 ID 130 MFC, 6950 ID 40 EEFC, 6952 ID 40 EEXFC, 6112 ID 70 EEFC, 6833 ID 70 EEFC, 8085 ID 70 EEMFC, 7236 ID Foam EEFC, 7284 ID 80 2300 EXO, 7285 OD 80 2400 EXO, 71531 ID 100 MFC EXO, 8016 ID 120 EXO, 6831 ID 135 EXO, Palmarole EXP 141/92B, Palmarole BA.K2.S1, Palmarole BA.F4.S, Palmarole BA.F2.S, Palmarole BA.K5.S, Palmarole BA.F4.E.MG, Palmarole BA.K3.EF, Palmarole BA.M4.E, Palmarole MB.BA10, Palmarole MB.BA.13, Palmarole MB.BA.15, Palmarole MB.BA.16, Palmarole MB.BA.18, Palmarole BA.M7.E, Palmarole BA.K2.S1, Palmarole BA.F4.S, Palmarole BA.K4.S, Palmarole BA.F2.S, Palmarole BA.K3.EF, Palmarole BA.K4.C, and Bergen International Foamazol™ series 32, 40, 41, 43, 50, 57, 60, 61, 62, 63, 70, 71, 72, 73, 73S, 90, 91, 92, 93, 94, 95, 96, as well as X0-255, X0-256, X0286, X0-330, X0-339, X0-355, X0-379, X0-385, X0-423, X0P-300, X0P-301, X0P-305, and X0P-341. As previously described, when using some classes of blowing agents, endothermic or exothermic types or combinations thereof, $CO_2$ gas is released and eventually exits the extruder as bubbles dispersed in the polymer melt. The bubbles expand to form cells which make up the lightweight polymeric sheet. The cells can be open or closed, but generally are closed. The cells can have an aspect ratio of less than or equal to 10, specifically, less than or equal to 7.5, more specifically, less than or equal to 5, even more specifically, less than or equal to 3. The cells can have a size of less than or equal to 500 micrometers (μm), specifically, less than or equal to 250 micrometers, more specifically, less than or equal to 200 micrometers, even more specifically, less than or equal to 100 micrometers, still more specifically, less than or equal to 50 micrometers, and yet more specifically, less than or equal to 20 micrometers. The amount of chemical blowing agent employed is dependent upon the process, processing conditions, and the specific polymeric material(s). In some embodiments, the amount of blowing agent can be 0.1 wt. % to 10 wt. %, or, specifically, 0.1 wt. % to 5 wt. %, or, more specifically, 1 wt. % to 4 wt. %, wherein the weight percent is based upon a total weight of the polymer composition (e.g., polymeric material(s), additive(s), blowing agent(s), nucleating agent(s), etc.) In some embodiments, the blowing agent can be 0.1 wt. % to 4 wt. %, or, specifically, 0.5 wt. % to 3 wt. %, and 0.25 wt. % to 2 wt. % of an additional, different blowing agent(s), or, specifically, 0.5 wt. % to 1.5 wt. % of the additional blowing agent(s).

The amount of physical blowing agent would be in an approximate range of 0.02% by weight in order to achieve the same lightweight sheet. These physical blowing agents encompass $CO_2$, $N_2$, $H_2O$, acetone, butane, argon as described earlier. Preferably ozone depleting agents are avoided due to environmental concerns.

It is anticipated that the choice of resin additive package will be based upon the blowing agent. In other words, an additive package will be included so as to counteract any counterion produced by the blowing agent. Therefore, an additive can be included in the composition such that the pH can be maintained in a desired range such that when counterions are produced they are neutralized. The desired pH will be dependent upon the particular polymeric material. A buffer can be added to the composition (polymer material) to neutralize counterions produced by the blowing agent. The lightweight sheet performance for long-term physical and mechanical properties including low-and-high temperature cycling performance, elevated temperature performance, resistance to environmental effects such as high humidity, etc., is influenced by resin stability. The resin additive package would be required to provide hydrolytic stability for performance of the chemical and/or physical blowing agent, by-products, and nucleation sites in the same manner as it would prevent premature resin decomposition during, for instance, an aggressive extrusion processing step.

During the manufacturing of the light weight polymeric sheets, most of chemical blowing agents leave the residues of the decomposition products in the polymer matrix that may be harmful to the polymer, e.g., that can deteriorate chemical resistance or hydrothermal resistance of the polymer matrix. Choice of chemical blowing agent is important for poly-condensation type polymers such as polycarbonates, polyarylates, polyesters and polyetherimides to minimize the harm. For example, if sodium bicarbonate is used as chemical blowing agent for making light-weight polycarbonate sheets, sodium bicarbonate thermally decomposes during the polycarbonate melt processing step into sodium carbonate, water and carbon dioxide, of which water and carbon dioxide work as blowing agent gas to form foamed structure in the polycarbonate sheet while the sodium carbonate residue left inside the final polycarbonate foamed sheet is relatively strong base that can harm hydrothermal resistance of the polycarbonate matrix if the hydrothermal resistance properties or long-term physical and mechanical properties retention is desired. On the other side, some other chemical blowing agents, with neutral or weak acid or weak base nature of their decomposition product residue at the temperature of the foaming process, may be more friendly to polycarbonate. The examples include mono-sodium citrate, citric acid, 5-phenyl-3,6-dihydro-2H-1,3,4-oxadiazin-2-one (PEDOX), 5-phenyl-1H-Tetrazole (5-PT), as well as combinations comprising at least one of these chemical blowing agents.

Accelerated hydrostability testing can be used to predict longer-term reliability of the light weight polymer sheet. Such test includes subjecting the polymeric material to 90° C. at 95% relative humidity for 14 days, or even more accelerated under pressure cooker condition such as 121° C. and 18 psi (pounds per square inch) moisture pressure for 24 hours (hrs). During this period, the resin would desirably lose no more than 30%, or more desirably lose no more than 10%, of the original starting molecular weight. These types of accelerated aging tests can be used as indicator of flexural strength and multi-axial impact properties retention.

Additional care in the selection of other resin package additives or cell control agents either in the bulk resin itself, or in a masterbatch including a chemical blowing agent, can influence the nucleation of foam cells by altering surface tension of the polymer composition or by serving as nucleation sites from which cells can grow. Nucleation agent(s) can be added to the polymer composition to promoting bubble formation during processing. Nucleation agents can be selected to develop cells of a particular size and density in the extruded or molded sheet/film, or part. Some possible nucleating agents include talc (magnesium silicate), glassfibers, fumed silica, titanium dioxide, calcium carbonate, zinc oxide, and so forth, as well as combinations comprising at least one of the foregoing. The amount and size of the nucleation agent(s) employed is dependent upon the process, processing conditions, the specific polymeric material(s), the blowing agent(s), desired cell size, and overall balance and performance of the resin additive package(s). In some embodiments, the amount of nucleating agent(s) can be less than or equal to 10 wt. %, or, specifically, 0.01 wt. % to 5 wt. %, or, more specifically, 0.02 wt. % to 1 wt. %, wherein the weight percent is based upon a total weight of the polymer composition.

It has been found that as the aspect ratio of the foam bubbles approaches 1, the mechanical properties improve. It was unexpectedly discovered that by using greater than 10 wt % of a disc shaped inorganic filler, the aspect ratio (length/width (l/w)) can be decreased, e.g., from about 5 to about 2. Therefore, an extruded, foamed, sheet with an aspect ratio of less than 3 can be achieved, and even less than or equal to 2. Possible disc shaped inorganic fillers include talc and mica, as well as combinations comprising at least one of the foregoing.

Various techniques can be employed to form the lightweight polymeric sheet, including a continuous process or a batch process. The batch process is primarily used for making foams with very specific properties or in smaller volumes per batch such as in co-injection molding, injection molding, rotational molding, gas-counter pressure molding, and structural foam molding. The continuous process, however, allows high-output conducive to production scale operations. These continuous processes can include extrusion, co-extrusion, chemical foam extrusion, and wire-and-cable extrusion. One type of continuous process is illustrated in FIG. 1. In an embodiment, the continuous process uses an extruder, e.g., a single screw-extruder or a tandem set-up. Either approach can use co-rotating twin-screws. The process comprises: introduction of polymeric material and any additive(s) to the throat of the extruder, melting of the polymeric material, dissolution of blowing agent(s) in the melted polymeric material, plasticization of the polymeric material, nucleation of bubbles (e.g., due to pressure drop at die), bubble growth after die, cell structure stabilization (e.g., in cooling and calendering) step. Desirably, cells nucleate in a limited number and grow simultaneously in the same speed in all directions to produce a foam with homogenous three-dimensional mechanical properties.

FIG. 1 illustrates an exemplary continuous process for producing the lightweight polymeric sheet. As can be seen from FIG. 1, the polymeric material (resin) and chemical blowing agent is introduced via a hopper 10 to the throat 11 of a main extruder 13. Optionally one or more side extruders 14 with associated hoppers 12 could be used depending upon the configuration of light weight sheet desired. Note that the chemical blowing agent or optional physical blowing agent introduced through gas injection port 21 would be added downstream of any extruder venting system or used with an unvented extruder. The resin and chemical blowing agent is introduced to the throat 11 to come into contact with the mixing section 15 of a rotating screw. The resin(s) melt while progressing through the heated extruder and the chemical blowing agent decomposes to release gas that is dissolved in the resin at high pressure and temperature. The resin melt exits the extruder barrel though a breaker plate and screen pack 22, which aides in keeping the gas dissolved by increasing backpressure in the extrusion barrel. The extrudate now enters a feedblock 16 that controls the resin stream from the main extruder 13 and side extruder 14 to position the optional caplayer(s) 49a and 49b (see FIG. 2). From the feedblock 16 the molten resin enters the die 18 wherein it is distributed for extrusion in sheet form through die lips 19. A pressure drop at the exit of the die 19 allows the dissolved gas to expand and create cells 52. The size, shape, and frequency of these cells 52 in turn are specifically controlled, e.g., by pulling the melt through calendaring rollers 20. The calendaring rollers 20 may serve several functions such as controlling thickness of the final sheet, cooling the sheet to lock in the cell 52 size, and texturing a coextruded layer.

Co-extrusion methods and/or coating methods (on-and-off line) can also be employed during the production of the sheet to supply different polymers to any surface portion of the sheet's geometry, to improve and/or alter the performance of the sheet, and/or to reduce raw material costs. For example, co-extrusion methods can be used to apply a cap layer to one or both sides of the sheet. In one embodiment, a co-extrusion process can be employed to add an aesthetic colorant to the top layer. A coating(s) can be disposed on any of the sheet's surfaces to improve the sheet's performance and/or properties. Exemplary coatings or co-extrusion layers can comprise antifungal coatings, hydrophobic coatings, hydrophilic coatings, light dispersion coatings, anti-condensation coatings, scratch resistant coatings, ultraviolet absorbing coatings, light stabilizer coatings, and the like. It is to be apparent to those skilled in the art of co-extrusion that a myriad of embodiments can be produced utilizing the co-extrusion process.

The lightweight polymeric sheet can be co-extruded with other layer(s). For example, as mentioned, the lightweight polymeric sheet can also, optionally, comprise cap layer(s). The lightweight polymeric sheet can be co-extruded, laminated, glued, etc., with a cap-layer that can be located adjacent any side of the lightweight sheet (e.g., top, bottom, and/or the side(s)). In general the cap layer can be of any thickness, and distributed front-to-back, or side-to-front-to-back, meeting requirements of density, mechanical properties, forming, texturing, aesthetics, etc. As previously described, the cap layer(s) can comprise the same or different materials than the core layer. The cap layer(s) can optionally comprise UV absorber(s) and other additives, organic or inorganic to customized performance, as previously described if desired for the end use application.

Figure 2:
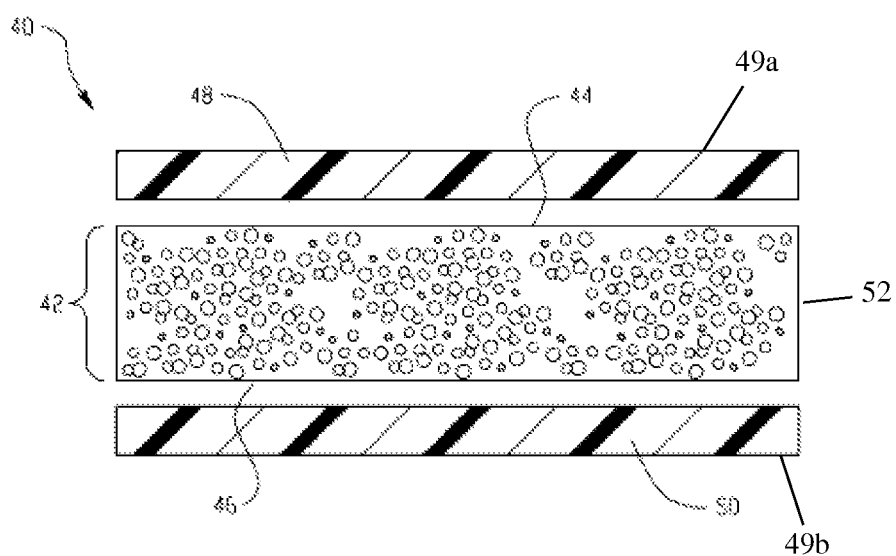
FIG. 2 is a depiction of a multilayer sheet with a core layer and optional cap layers.

FIG. 2 illustrates a multilayer sheet 40 comprising a core layer 42 where the core layer can comprise a foamed polymeric sheet with cells 52. The core layer 42 can have a first surface 44 and a second surface 46. A cap layer can be co-extruded onto the first surface and/or the second surface. A first cap layer 48 can be disposed upon and in intimate contact (e.g., physical contact) with the first surface 44 of the core layer 42 and/or a second cap layer 50 can be disposed upon and in intimate contact with (e.g., physical contact) with the second surface 46 of the core layer 42. The outer surface 49a of cap layer 48 and optionally the outer surface 49b of cap layer 50 may be textured using calendaring roller(s) 20.

The lightweight sheet can also be a multiwalled sheet or corrugated sheet and the like. These are anticipated to be variants of the general concepts explained herein involving the use of different die configurations and/or downstream processing equipment. For instance, multiwall would use a specialized die to produce transverse layers for structural integrity and use a downstream calibrator to control overall thickness of the part. A corrugated part would, for example, use computer controlled forming equipment in-or-off line to manufacture the lightweight corrugated product. Light transmission and gloss control can all be controlled by previously described processes.

It is further contemplated that the lightweight polymeric sheet can comprise additional core and cap layers (e.g., greater than or equal to two core layers and/or greater than or equal to two cap layers). Additionally, the lightweight polymeric sheet can also comprise layers dispersed between the core and cap layers, for example, an interlayer or an adhesive layer, such that the core layer can then be in contact with the interlayer and the interlayer can be in contact with the cap layer, or any combination thereof. Additional layers or coatings can also be present on the surface of the cap layers (such that the cap layer is between the coating and the core layer). Such layers can include, but are not limited to, hardcoats (e.g., an abrasion resistant coating as previously described), UV resistant layers, IR absorbing layers, etc. The additional layers contemplated can be added with the proviso that they not adversely affect the desired properties of the multilayer sheet (i.e., flame retardancy (retaining at least a UL rating of V0 at a thickness of 1.0 mm), and/or smoke density (consistently passing smoke density testing)). Any feasible combination of the above described additional layers is also contemplated.

Figure 3:
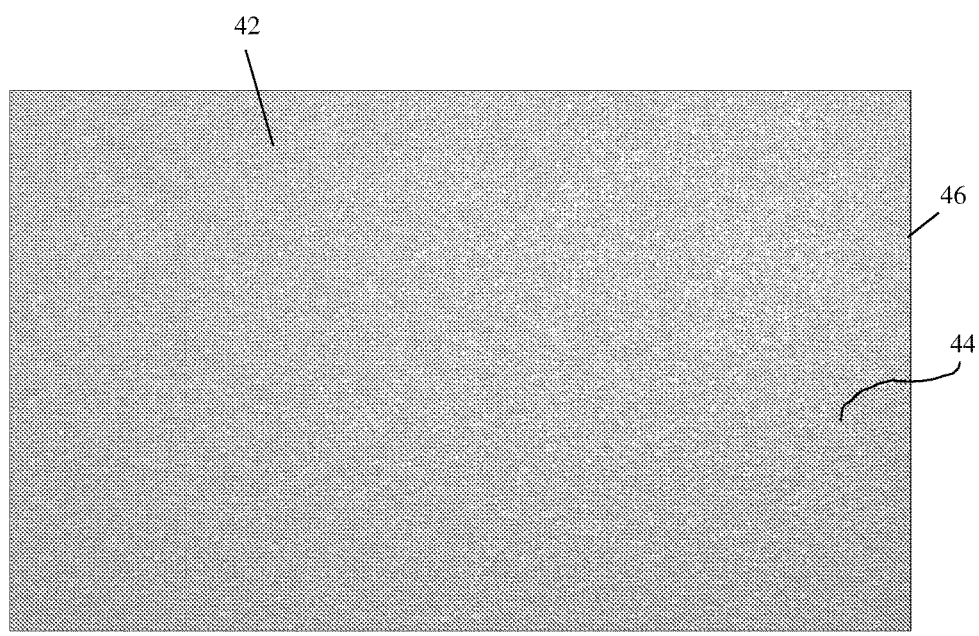
FIG. 3 is a front view of a self-texturing lightweight sheet.
Figure 4:
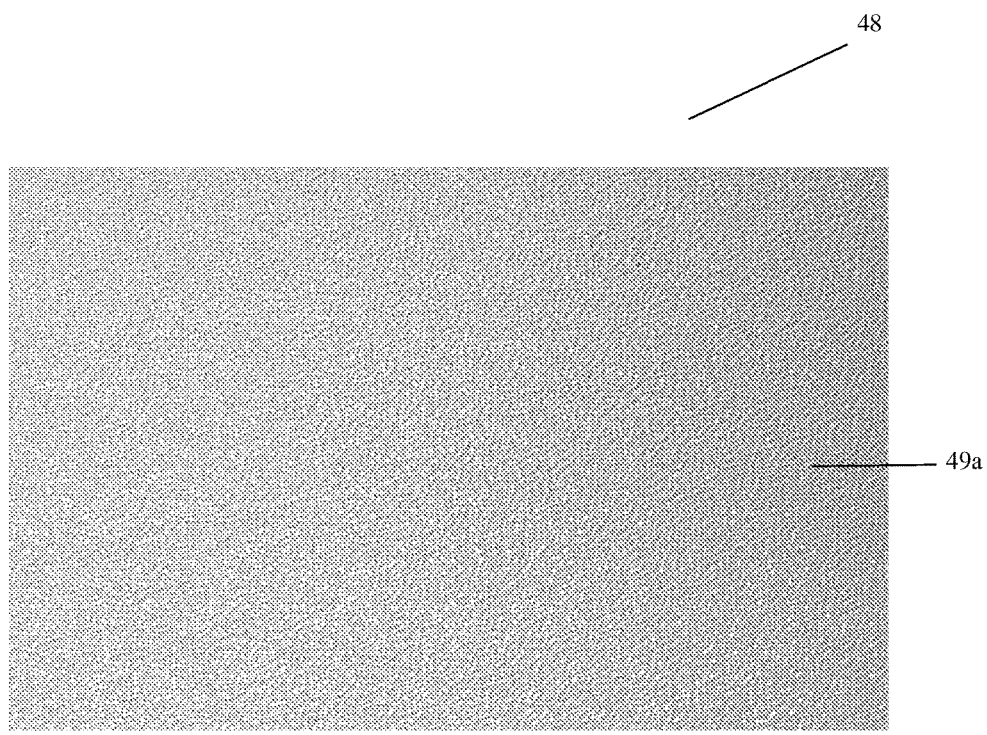
FIG. 4 is a front view of a calendered textured sheet.
Figure 5:
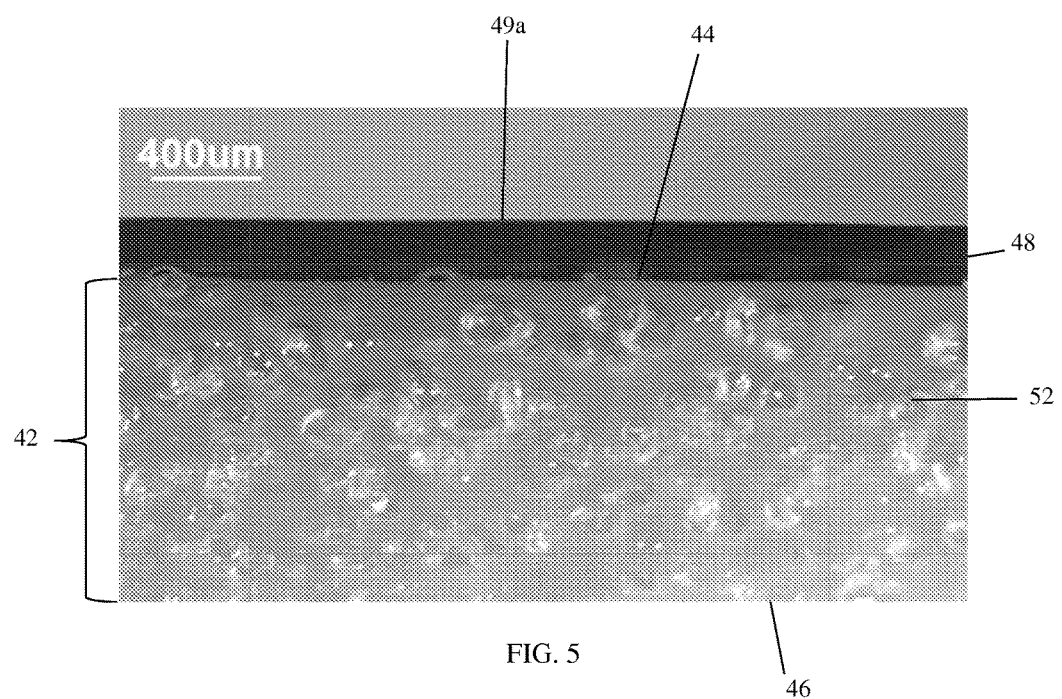
FIG. 5 is a cross-sectional view of a lightweight polymeric sheet.

FIGS. 3, 4, and 5 represent various embodiments of the inventions described herein. FIG. 3 is an example of a self-texturing core sheet 42 without cap layers 48 or 50. The core layer first surface 44 and, optionally, core layer second surface are textured with the closed-structured cells themselves to create a low gloss surface. The cell size, frequency, and distribution permits the self-texturing feature. Surprisingly these cell features are maintained during thermoforming operations to retain their low gloss appearance as opposed to being washed out with application of heat.

FIG. 4 is an example of a low gloss surface calendered onto a cap layer 48. The core layer 42 (not shown in FIG. 4) can have a different cell size, distribution and frequency to enable calendaring replication at higher force without collapsing or otherwise altering the desired cell structure.

Finally, FIG. 5 is a cross-section view of a core layer 42, optional cap layer 48 and their associated surfaces 46, 44, and 49a. The cells 52 depicted in the cross-section are of the closed cell type, which is preferred for applications intended.

Gloss of the sheet material has an aesthetic purpose for several intended transportation applications. For instance, it can reduce glare of sunlight coming through and into passenger compartments of planes, trains, and buses. The self-texturing and calendered lightweight sheet are uniquely suitable for this purpose. Gloss is simply defined as how reflective a material is at a specified angle. A polished black glass with a refractive index of 1.567, having a gloss unit value of 100 as per ATSM D523, is used to compare these sheet samples. The measurement geometry is taken as a light source offset perpendicular to the sample. Thus, measurements are commonly made at 20°, 60°, and 85° geometries. High gloss is typically described as >70 gloss units (g.u.) at 20°, semi-gloss is 10-70 g.u. at 60°, and low gloss is described as <10 g.u. at 85° geometry. Table 1 describes the gloss units measured from FIGS. 3 and 4, which would be considered a low gloss with any of the geometries tested. The measurements were taken from three different locations of the samples at both machine direction (MD) and transverse direction (TD).

TABLE 1

| Gloss Measurements for FIGS. 3 and 4 | | | | | | |
| --- | --- | --- | --- | --- | --- | --- |
| FIG. 3 Sample #1 | 20 Deg | 60 Deg | 85 Deg | FIG. 3 Sample #1 | 20 Deg | 60 Deg | 85 Deg |
| MD-Top-1 | 1.3 | 7.0 | 8.8 | TD-Top-1 | 1.3 | 6.2 | 2.7 |
| MD-Top-2 | 1.3 | 6.9 | 8.3 | TD-Top-2 | 1.3 | 6.5 | 2.9 |
| MD-Top-3 | 1.3 | 7.4 | 9.1 | TD-Top-3 | 1.3 | 6.4 | 2.9 |
| FIG. 3 Sample #2 | 20 Deg | 60 Deg | 85 Deg | FIG. 3 Sample #2 | 20 Deg | 60 Deg | 85 Deg |
| MD-Top-1 | 1.3 | 6.6 | 8.9 | TD-Top-1 | 1.2 | 6.0 | 2.6 |
| MD-Top-2 | 1.3 | 6.7 | 8.6 | TD-Top-2 | 1.2 | 6.0 | 2.6 |
| MD-Top-3 | 1.3 | 7.0 | 8.4 | TD-Top-3 | 1.3 | 6.1 | 2.7 |
| FIG. 4 Sample #1 | 20 Deg | 60 Deg | 85 Deg | FIG. 4 Sample #1 | 20 Deg | 60 Deg | 85 Deg |
| MD-Top-1 | 0.4 | 3.9 | 7.0 | TD-Top-1 | 0.4 | 3.7 | 4.4 |
| MD-Top-2 | 0.4 | 3.8 | 6.5 | TD-Top-2 | 0.4 | 3.8 | 4.5 |
| MD-Top-3 | 0.4 | 3.9 | 7.0 | TD-Top-3 | 0.4 | 3.7 | 4.5 |
| FIG. 4 Sample #2 | 20 Deg | 60 Deg | 85 Deg | FIG. 4 Sample #2 | 20 Deg | 60 Deg | 85 Deg |
| MD-Top-1 | 0.9 | 2.6 | 3.6 | TD-Top-1 | 0.9 | 2.9 | 3.3 |
| MD-Top-2 | 0.9 | 3.1 | 4.0 | TD-Top-2 | 0.9 | 2.9 | 3.3 |
| MD-Top-3 | 0.9 | 3.7 | 5.0 | TD-Top-3 | 0.9 | 3.2 | 3.7 |

The sheet can be formed into various shapes for the applications intended without losing the characteristics of the produced surface. Therefore, a low gloss outer surface of 44 or 49a in the lightweight sheet can have the texture and gloss level retained after forming. The forming techniques can be, for instance, drape, niebling, and other deep draw forming methods.

Set forth below are some embodiments of the lightweight polymer sheet, methods of making and articles using the same.

Embodiment 1

A polymeric sheet, comprising: a foamed layer comprising a polymeric material, wherein the polymeric material has a Tg of greater than or equal to 100° C.; and wherein the sheet has a weight reduction of 10% to 60%, as compared to a solid sheet of the same geometry and size formed from the same polymeric material; and wherein the sheet, at a thickness of 1.0 mm, passes at least one of the following heat release requirements: 1) has a two minute integrated heat release rate of less than or equal to 65 kilowatt-minutes per square meter and a peak heat release rate of less than 65 kilowatts per square meter according to Part IV, OSU Heat Release of FAR/JAR 25.853, Amendment 25-116; 2) has a maximum averaged rate of heat emission (MARHE) of less than or equal to 90 kW/m$^2$ with 50 kW/m$^2$ irradiance level test condition according to ISO 5660-1; wherein the sheet, at the thickness of 1.0 mm, has a smoke density of less than or equal to 200 particles after four minutes of burning according to ASTM E662-06; and wherein the sheet is thermoformable.

Embodiment 2

A polymeric sheet, comprising: a foamed layer comprising a polymeric material, wherein the polymeric material has a Tg of greater than or equal to 100° C.; and wherein the sheet has a weight reduction of 10% to 60%, as compared to a solid sheet of the same geometry and size formed from the same polymeric material; and wherein the sheet is thermoformable.

Embodiment 3

The sheet of any of Embodiments 1-2, wherein the sheet has self-texturing.

Embodiment 4

The sheet of any of Embodiments 1-3, wherein at least one side of the sheet has a gloss level of less than 90 g.u. as measured at 60 degrees using ATSM DS2457-08e1 and a BYK Gardner Gloss Meter.

Embodiment 5

The sheet of Embodiment 4, wherein at the gloss level is less than 50 g.u.

Embodiment 6

The sheet of any of Embodiments 4-5, wherein at least one side of the sheet wherein the gloss level is less than 20 g.u.

Embodiment 7

The sheet of any of Embodiments 4-6, wherein at least one side of the sheet wherein the gloss level is less than 5 g.u.

Embodiment 8

The sheet of any of Embodiments 1-7, wherein at least one side of the sheet maintains a gloss level of less than 95 g.u. after thermoforming, as measured at 60 degrees using ATSM DS2457-08e1 and a BYK Gardner Gloss Meter.

Embodiment 9

The sheet of any of Embodiments 1-8, wherein at least one side of the sheet maintains a gloss level of less than 60 g.u. after thermoforming, as measured at 60 degrees using ATSM DS2457-08e1 and a BYK Gardner Gloss Meter.

Embodiment 10

The sheet of any of Embodiments 1-9, wherein at least one side of the sheet maintains a gloss level of less than 30 g.u. after thermoforming, as measured at 60 degrees using ATSM DS2457-08e1 and a BYK Gardner Gloss Meter.

Embodiment 11

The sheet of any of Embodiments 1-10, wherein at least one side of the sheet maintains a gloss level of less than 10 g.u. after thermoforming, as measured at 60 degrees using ATSM DS2457-08e1 and a BYK Gardner Gloss Meter.

Embodiment 12

The sheet of any of Embodiments 1-11, wherein the polymeric material comprises at least one from polycarbonate, polyarylate, polyester, polyphenylene ether, polystyrene, acrylonitrile butadiene styrene, polyether, polyimide, polyetherimide, polysulfone, polyether ketone, polyether ether ketone, poly(methyl methacrylate), polyvinyl chloride, polysiloxane, and combinations comprising at least one of the foregoing.

Embodiment 13

The sheet of any of Embodiments 1-12, wherein the polymeric material comprises at least one from polycarbonate, polyarylate, polyester, polyphenylene ether, polystyrene, acrylonitrile butadiene styrene, polyetherimide, polysiloxane, and combinations comprising at least one of the foregoing.

Embodiment 14

The sheet of any of Embodiments 1-12, wherein the polymeric material comprises at least one from polyarylate, polyester, polyphenylene ether, polystyrene, acrylonitrile butadiene styrene, polyetherimide, polysiloxane, and combinations comprising at least one of the foregoing.

Embodiment 15

The sheet of any of Embodiments 1-14, wherein foamed layer was foamed with a chemical blowing agent comprising at least one from carbon dioxide, sodium bicarbonate, monosodium citrate, citric acid, 5-phenyl-3,6-dihydro-2H-1,3,4-oxadiazin-2-one, 5-phenyl-1H-Tetrazole, and combinations comprising at least one of the foregoing.

Embodiment 16

The sheet of any of Embodiments 1-15, wherein foamed layer was foamed with a chemical blowing agent comprising at least one from monosodium citrate, citric acid, 5-phenyl-3,6-dihydro-2H-1,3,4-oxadiazin-2-one, 5-phenyl-1H-Tetrazole, and combinations comprising at least one of the foregoing.

Embodiment 17

The sheet of any of Embodiments 1-16, wherein the foamed layer further comprises core-shell rubber particles dispersed in the polymeric material, wherein the core-shell rubber particles have a median particle size ($D_{50}$) of 0.1 micrometer to 100 micrometers.

Embodiment 18

The sheet of 17, wherein the core-shell rubber particles comprise a cross-linked rubber core that comprises at least one from butadiene rubber, styrene-butadiene rubber, acrylonitrile-butadiene rubber, poly(alkyl acrylate) rubber, and silicone-acrylic rubber.

Embodiment 19

The sheet of any of Embodiments 1-18, wherein the foamed layer further comprises greater than to 10 wt % disc shaped inorganic filler dispersed in the polymeric material, based upon a total weight of the foamed layer.

Embodiment 20

The sheet of Embodiment 19, wherein the inorganic filler comprises at least one of talc and mica.

Embodiment 21

The sheet of Embodiment 20, wherein the inorganic filler comprises talc.

Embodiment 22

The sheet of any of Embodiments 1-21, wherein the foamed layer has an average foam bubble size of less than or equal to 100 micrometers, or preferably less than or equal to 50 micrometers; and wherein the average foam bubble size is the number-average diameter of foam bubbles measured from the two-dimensional microscopy images of the cross-sectional sample that is perpendicular to the extrusion direction of the foamed layer.

Embodiment 23

The sheet of any of Embodiments 1-22, wherein the sheet, at a thickness of 3.0 mm, has a burn time of less than or equal to 15 seconds and a burn length of less than or equal to 6 inches, wherein a longest burning particle self-extinguishes with less than or equal to 3 seconds according to a 60 second vertical burn test pursuant to FAR 25.853, Appendix F (2012), Part I, a, 1, i.

Embodiment 24

The sheet of any of Embodiments 1-23, wherein the sheet, at a thickness of 3.0 mm, and/or 2.0 mm, and/or 1.0 mm, has a two minute integrated heat release rate of less than or equal to 55 kilowatt-minutes per square meter and a peak heat release rate of less than 55 kilowatts per square meter, and passes Part IV, OSU Heat Release of FAR/JAR 25.853, Amendment 25-116.

Embodiment 25

The sheet of any of Embodiments 1-24, wherein the sheet, at a thickness of 3.0 mm, and/or 2.0 mm, and/or 1.0 mm, has a smoke density of less than or equal to 150 particles after four minutes of burning according to ASTM E662-06.

Embodiment 26

The sheet of Embodiment 25, wherein the smoke density is less than or equal to 100 particles.

Embodiment 27

The sheet of any of Embodiments 1-26, wherein the sheet, at a thickness of 3.0 mm, and/or 2.0 mm, and/or 1.0 mm, passes the gas toxicity tests promulgated by Airbus ABD0031, Issue: F (2005) and/or Boeing BSS 7239, Revision A (1988).

Embodiment 28

The sheet of any of Embodiments 1-27, wherein the sheet, at a thickness of 3.0 mm, and/or 2.0 mm, and/or 1.0 mm, obtains a flame spread index of less than or equal to 35 when tested according to ASTM E 162-08.

Embodiment 29

The sheet of any of Embodiments 1-28, wherein the sheet is rated M1 when tested according to NF P 92-503.

Embodiment 30

The sheet of any of Embodiments 1-29, wherein the sheet is rated M1 class F1 when tested according to NF F 16-101 (1988).

Embodiment 31

The sheet of any of Embodiments 1-30, wherein the sheet passes European railway and American rail standards.

Embodiment 32

The sheet of any of Embodiments 1-31, the sheet has an initial weight average molecular weight, and wherein the sheet retains 70% or greater of the initial weight average molecular weight after the sample is subject to a pressure cooker treatment of 24 hours under 121° C. and 18 psi moisture pressure condition.

Embodiment 33

The sheet of Embodiment 32, the sheet retains 90% or greater of the initial weight average molecular weight after the sample is subject to a pressure cooker treatment of 24 hours under 121° C. and 18 psi moisture pressure condition.

Embodiment 34

The sheet of any of Embodiments 1-33, wherein the sheet has a density of greater than 0.60 g/cm$^3$ to less than or equal to 1.1 g/cm$^3$.

Embodiment 35

The sheet of any of Embodiments 1-34, wherein the sheet, at a thickness of 2.0 mm, passes at least one of the following heat release requirements: 1) has a two minute integrated heat release rate of less than or equal to 65 kilowatt-minutes per square meter and a peak heat release rate of less than 65 kilowatts per square meter according to Part IV, OSU Heat Release of FAR/JAR 25.853, Amendment 25-116; and 2) has a maximum averaged rate of heat emission (MARHE) of less than or equal to 90 kW/m$^2$ with 50 kW/m$^2$ irradiance level test condition according to ISO 5660-1; wherein the sheet, at the thickness of 1.0 mm, has a smoke density of less than or equal to 200 particles after four minutes of burning according to ASTM E662-06.

Embodiment 36

The sheet of any of Embodiments 1-34, wherein the sheet, at a thickness of 3.0 mm, passes at least one of the following heat release requirements: 1) has a two minute integrated heat release rate of less than or equal to 65 kilowatt-minutes per square meter and a peak heat release rate of less than 65 kilowatts per square meter according to Part IV, OSU Heat Release of FAR/JAR 25.853, Amendment 25-116; and 2) has a maximum averaged rate of heat emission (MARHE) of less than or equal to 90 kW/m² with 50 kW/m² irradiance level test condition according to ISO 5660-1; wherein the sheet, at the thickness of 1.0 mm, has a smoke density of less than or equal to 200 particles after four minutes of burning according to ASTM E662-06.

Embodiment 37

An article formed from the sheet of any of Embodiments 1-36.

Embodiment 38

The article of Embodiment 37, further comprising at least one solid layer adjacent to the sheet.

Embodiment 39

The article of Embodiment 38, wherein the sheet is located between two solid layers.

Embodiment 40

The article of any of Embodiments 37-39, further comprising a second foamed layer adjacent to the solid layer or the sheet.

Embodiment 41

The article of any of Embodiments 37-40, wherein the article comprises more than one of the sheets, and wherein the structure comprises alternating solid layers and the sheets.

Embodiment 42

The article of any of Embodiments 37-41, wherein the article is an aircraft interior component, railcar interior component, a motorized vehicle interior part, luggage, a shed, a garage, a tractor truck trailer skirt, a wind deflector, or a panel. For example the article can be a panel on a truck, a panel on a wall, a panel on a floor, or a panel on a sign.

Embodiment 43

A method of making the sheet of any of Embodiments 1-36, comprising: melting the polymeric material to form a melt; combining the melt and a chemical blowing agent to form a mixture; neutralizing counterions produced by the blowing agent; nucleating bubbles in the mixture to produce cells; and forming the mixture into a sheet comprising an expanded core layer.

Embodiment 44

The method of Embodiment 43, wherein forming the mixture into a sheet comprises extruding the mixture.

Embodiment 45

The method of any of Embodiments 43-44, wherein the melt and the chemical blowing agent are combined in an extruder.

The following examples are merely illustrative of the device disclosed herein and are not intended to limit the scope hereof.

EXAMPLES

Example 1

In this example, two polycarbonate lightweight sheets (Samples 2 and 3) using SABIC Lexan™ 103R polycarbonate resin were produced. Sodium bicarbonate ($NaHCO_3$), which releases carbon dioxide gas ($CO_2$) upon heating, was used as the blowing agent. This was produced on a lab scale extrusion line with a 30 inch (762 millimeters (mm)) single cavity die. The extrusion line setup included a 3 roll stack and a 2.5 inch (63.5 mm) main extruder. The extruder line was started on solid sheet using Lexan™ 103R polycarbonate resin available from SABIC at melting temperature of 240-270° C. and an operation pressure of 50-200 Bar (5000-20000 kiloPascals (kPa)). The chemical blowing agent was added at ~1.2 wt. %, to produce the polycarbonate lightweight sheets with the target density of 0.84 g/cm³. Lightweight foam sheets with uniform cap layer thickness were achieved. The average sample thickness, top/bottom cap layer thickness, and the overall density are listed in Table 2. Sample 1 is the polycarbonate solid sheet using the same resin and extrusion equipment for comparison of physical properties. The samples were tested for multiaxial impact properties (ASTM D3763) including energy to maximum load, energy to failure, and total energy, all measured in Joules (J); maximum load sustained before breaking measured in kiloNewtons (kN), deflection at the maximum load measured in mm, and ductility in %, as shown in Table 3. The samples were also tested for flexural properties (ASTM D790) in the machine direction (MD) and transverse direction (TD) for flexural modulus and flexural stress measured in MegaPascals (MPa) as given in Table 4. Both lightweight samples have similar thickness and weight reduction (~30%), although different cap layer thickness. Sample 3 had thicker cap layers and better mechanic properties (impact and stiffness).

TABLE 2

| Sample No. | Sample Thickness (mm) | Top/Bottom Cap Layer Thickness (mm) | Density (g/cm³) |
|---|---|---|---|
| 1 | 1.5 | N/A | 1.2 |
| 2 | 2.2 | 0.1 | 0.83 |
| 3 | 2.4 | 0.2 | 0.86 |

TABLE 3

| | | Sample No. | | |
|---|---|---|---|---|
| | | 1 | 2 | 3 |
| Energy to max load | J | 34 | 7 | 13 |
| Energy to failure | J | 35 | 10 | 17 |
| Energy, Total | J | 35 | 11 | 19 |
| Max Load | kN | 3 | 1 | 2 |
| Deflection at max load | mm | 19 | 10 | 14 |
| Ductility | % | 100 | 100 | 100 |

TABLE 4

| | | Sample No. | | | | |
|---|---|---|---|---|---|---|
| | | 1 | | 2 | | 3 |
| | | MD | TD | MD | TD | MD | TD |
| Flexural Modulus | MPa | 2393 | 2510 | 1700 | 1570 | 1860 | 1780 |
| Flex Stress@5% Strain | MPa | 87 | 88 | 54 | 49 | 65 | 60 |
| Flexural Stress@Yield | MPa | 85 | 91 | 54 | 49 | 65 | 60 |

Example 2

In this example, samples were made and tests conducted to evaluate the equipment requirements, e.g., rate, screw design, melt pump, roll stack constraints, feed conditions, etc., and process concerns associated with the production of polycarbonate lightweight sheets having a density in the range of 0.61 g/cm$^3$ to 1.0 g/cm$^3$, specifically, 0.7 g/cm$^3$ to 0.85 g/cm$^3$. The extrusion line setup included a machine with a 3 roll stack and a 6 inch main extruder followed by a gear pump. The use of gear pump was to isolate the pressure variability due to surging and therefore to provide more uniform gauge. It's desirable to have single phase in order to have uniform cell dispersion and uniform cap layer thickness under high pressure in the die cavity. It is not favorable to have two phases of gas and melt in the die under low pressure. The vent was plugged using an original equipment manufacturer (OEM) vent plug to prevent the blowing agent from escaping. Sodium bicarbonate (NaHCO$_3$), which releases carbon dioxide gas (CO$_2$) upon heating, was used as the blowing agent. A single cavity 56 inch (142 centimeters (cm)) die gapped to 0.100 inch (2.5 millimeters (mm)) was used. The extruder line was also equipped with a batch blender delivering a gravimetrically controlled blend in 8 kilogram (kg) batches. The fill sensor was relocated near the feed throat to minimize the amount of material above the extruder screw and cycle between 4 to 12 kg allowing for fast recipe changes. A co-extruder was used to deliver neat polycarbonate resin as cap layers to the foamed core layer.

The extruder line was started on solid sheet using Lexan* 103R polycarbonate resin available from SABIC at melting temperature of 240-270° C. and an operation pressure of 50 to 200 Bar (5,000 to 20,000 kiloPascals (kPa)). The chemical blowing agent was added at 0.8-1.2 wt. %, to produce the lightweight polycarbonate sheets. A light weight within the target density range of 0.7 g/cm$^3$ to 0.85 g/cm$^3$ was produced at the melt pump at 15 revolutions per minute (rpm) and 550 kilograms per hour (kg/hr), resulting in a discharge pressure of 1,230 pounds per square inch (psi, 8.48 MegaPascals (MPa)). Lightweight sheet was also produced at 10 rpm and 370 kg/hr, resulting in a discharge pressure of 2,030 pounds per square inch (psi) (14 MPa).

Appearance of the lightweight sheets e.g., elimination of drag marks, was controlled by adjusting the melt temperature of cap layers relative to lighter weight core layer. This also improved the cap layer thickness consistency across the web, as shown in Table 5 for Sample 5. Here, EDGE 1 refers to one edge of the lightweight sheet, MID to the middle of the sheet, and EDGE 2 to the other side of the sheet. ⅔ between EDGE 1 and MID refers to a thickness measurement ⅔ of the distance between EDGE 1 and MID, ⅓ refers to a thickness measurement ⅓ of the distance between EDGE 1 and MID, and so forth with the measurements between MID and EDGE 2. The speed of the melt can be adjusted by the total flow rate and the die gap adjusted to produce a lightweight sheet structure with uniform cell morphology (size and distribution), as shown in FIG. 5.

TABLE 5

| | Cap Layer Thickness | | | Sample Thickness |
|---|---|---|---|---|
| Sample Position | Top (μm) | Bottom (μm) | Density | (mm) |
| EDGE 1 | 89 | 64 | 0.77 | 2.5 |
| ⅔ | 73 | 74 | 0.77 | 2.6 |
| ⅓ | 74 | 80 | 0.77 | 2.9 |
| MID | 69 | 73 | 0.77 | 2.7 |
| ⅓ | 80 | 77 | 0.77 | 2.8 |
| ⅔ | 83 | 78 | 0.77 | 2.7 |
| EDGE 2 | 81 | 77 | 0.77 | 2.7 |

Table 6 lists the thickness of the sample and the top/bottom cap layer for polycarbonate lightweight Samples 4 to 8 using SABIC Lexan* 103R polycarbonate resin. As can be seen in Table 6, the density, measured in grams per cubic centimeter (g/cm$^3$), of each lightweight sheet was within a desired range of 0.61 g/cm$^3$ to 1.0 g/cm$^3$, specifically, 0.7 g/cm$^3$ to 0.85 g/cm$^3$. Sample 4 did not have a cap layer. The MAI (multiaxial impact, ASTM D3763) for those five sheet samples were measured at 23° C. with a velocity of 3.3 m/s, as listed in Table 7. For sheet samples with the same thickness, the thicker the cap layer, the higher the impact. The 3-point flexural test according to ASTM D790 was also measured at 23° C. with a testing speed of 1.27 mm/min, as listed in Table 8. The flexural modulus for lightweight samples in machine direction (MD) is higher than transverse direction (TD), indicating some cell anisotropy. Inspection by microscopy revealed the cells to be oriented preferentially in the machine direction, which is believed to contribute to anisotropic physical properties.

TABLE 6

| Sample No. | Sample Thickness (mm) | Top/Bottom Cap Layer Thickness (mm) | Density (g/cm$^3$) |
|---|---|---|---|
| 4 | 2 | N/A | 0.93 |
| 5 | 2.5 | 0.08 | 0.77 |
| 6 | 2.5 | 0.13 | 0.84 |
| 7 | 5.5 | 0.10 | 0.80 |
| 8 | 5.5 | 0.23 | 0.81 |

TABLE 7

| | | Sample No. | | | | |
|---|---|---|---|---|---|---|
| | | 4 | 5 | 6 | 7 | 8 |
| Energy, Total | J | 18 | 16 | 19 | 40 | 49 |
| Energy to max load | J | 10 | 6 | 9 | 14 | 18 |
| Energy to failure | J | 14 | 13 | 15 | 31 | 38 |
| Max Load | kN | 2 | 1 | 2 | 2 | 3 |
| Deflection at max load | mm | 12 | 10 | 12 | 10 | 10 |
| Ductility | % | 100 | 100 | 100 | 100 | 100 |

TABLE 8

| | | Sample No. | | | | | | | | | |
|---|---|---|---|---|---|---|---|---|---|---|---|
| | | 4 | | 5 | | 6 | | 7 | | 8 | |
| | | MD | TD | MD | TD | MD | TD | MD | TD | MD | TD |
| Flexural Modulus | MPa | 1870 | 1770 | 1487 | 1233 | 1803 | 1563 | 1253 | 1100 | 1377 | 1277 |
| Flex Stress@ 5% Strain | MPa | 61 | 55 | 51 | 39 | 63 | 50 | 47 | 39 | 52 | 46 |
| Flexural Stress@Yield | MPa | 62 | 55 | 52 | 39 | 63 | 51 | 51 | 44 | 56 | 50 |

The vacuum pressure in the main gear pump for the lightweight core layer was controlled (e.g., to eliminate surging and pressure fluctuation) during extrusion. The melt temperature is such that the center of the die, which is air cooled, could not be lowered below 240° C. (464° F.) at 15 rpm or below 220° C. (428° F.) at 10 rpm but the edges can be controlled to 215° C. (419° F.). The lower melt temperature (e.g., 220° C. (428° F.)) associated with the 10 rpm screw speed resulted in a significantly higher gear pump discharge pressure of 14.5 MPa (2,100 psi) compared to the 15 rpm screw speed, which resulted in a discharge pressure of 10 MPa (1,450 psi).

In Example 2, a chemical blowing agent loading of 0.8 to 1.25 wt. % resulted in a lightweight sheet with the target density of 0.7 g/cm$^3$ to 0.85 g/cm$^3$ with cap layers present. Without a cap layer, a chemical blowing agent loading of 1.2 wt. % resulted in a density of 0.93 g/cm$^3$. Die gap is related to a given thickness and density (independent of rate) so as to match the melt velocity with the velocity of the sheet, which will be larger due to the expansion.

lightweight sheets also passed the FR and smoke testing according to the standard testing methods listed previously.

TABLE 9

| | | Sample No. | | | |
|---|---|---|---|---|---|
| | | 9 | 10 | 11 | 12 |
| Energy to max load | J | 10 | 55 | 6 | 40 |
| Energy to failure | J | 13 | 57 | 8 | 42 |
| Energy, Total | J | 17 | 57 | 9 | 42 |
| Max Load | kN | 2 | 5 | 1 | 4 |
| Deflection at max load | mm | 13 | 22 | 10 | 20 |
| Ductility | % | 100 | 100 | 100 | 100 |

TABLE 10

| | | Sample No. | | | | | | | |
|---|---|---|---|---|---|---|---|---|---|
| | | 9 | | 10 | | 11 | | 12 | |
| | | MD | TD | MD | TD | MD | TD | MD | TD |
| Tensile Modulus | MPa | 1294 | 1128 | 2150 | 2156 | 1364 | 1166 | 2157 | 2163 |
| Tensile Strength@break | MPa | 29 | 25 | 60 | 55 | 24 | 23 | 60 | 51 |
| Tensile Strain@break | % | 29 | 18 | 112 | 103 | 29 | 18 | 101 | 80 |
| Yield Stress | MPa | 30 | 27 | 59 | 59 | 31 | 26 | 60 | 59 |
| Yield % Strain | % | 5 | 13 | 6 | 6 | 5 | 17 | 6 | 6 |

Example 3

In this example, polycarbonate lightweight sheet with a thickness of 2 mm (Sample 9) and a thickness of 1.5 mm (Sample 11) using SABIC Lexan™ FR polycarbonate resin were obtained. Both samples have a top/bottom cap layer thickness of 0.1 mm and meet the target overall density of 0.84 g/cm$^3$ (30% weight reduction). As a control, Samples 10 and 12 were manufactured as solid sheet using Lexan™ 103R with a thickness of 2.0 mm and 1.5 mm respectively. Those polycarbonate lightweight and solid sheets were tested for multiaxial impact properties (ASTM D3763) and tensile properties (ASTM D638) in MD and TD, as shown in Tables 9 and 10. Tensile specimens were tested using Instron 3366 at 23° C. with a 2 kN load cell at a strain rate of 5 mm/min until failure. The measured values were tensile modulus, stress at break, yield stress, all measured in MPa; and strain at break, yield % strain, all measured in %. The

Example 4

In this example, four polycarbonate lightweight sheets (Samples 13 to 16) were produced using SABIC Lexan™ FST resin. The thickness, top/bottom cap layer thickness, and density are indicated in Table 11. All samples have ~30% weight reduction (targeting a density of 0.93 g/cm$^3$). The lightweight Lexan* FST sheets were evaluated for multiaxial impact properties (ASTM D3763) and flexural properties (ASTM D790) in the machine direction (MD) and transverse direction (TD), as shown in Tables 12 and 13. Those lightweight sheets pass the FR and OSU testing according to the standard testing methods listed previously.

TABLE 11

| Sample No. | Sample Thickness (mm) | Top/Bottom Cap Layer Thickness (mm) | Density (g/cm³) |
|---|---|---|---|
| 13 | 2 | 0.1 | 0.84 |
| 14 | 2 | 0.2 | 0.94 |
| 15 | 3 | 0.1 | 0.83 |
| 16 | 3 | 0.2 | 0.90 |

TABLE 12

| | | Sample No. | | | |
|---|---|---|---|---|---|
| | | 13 | 14 | 15 | 16 |
| Energy to max load | J | 3 | 5 | 5 | 8 |
| Energy to failure | J | 6 | 9 | 11 | 12 |
| Energy, Total | J | 7 | 10 | 11 | 12 |
| Max Load | kN | 1 | 1 | 1 | 2 |
| Deflection at max load | mm | 6 | 9 | 9 | 10 |

TABLE 13

| | | Sample No. | | | | | | | |
|---|---|---|---|---|---|---|---|---|---|
| | | 13 | | 14 | | 15 | | 16 | |
| | | MD | TD | MD | TD | MD | TD | MD | TD |
| Flexural Modulus | MPa | 1597 | 1340 | 1883 | 1773 | 1487 | 1287 | 1663 | 1523 |
| Flex Stress@5% Strain | MPa | 52 | 42 | 65 | 61 | 56 | 47 | 62 | 56 |
| Flexural Stress@Yield | MPa | 53 | 42 | 66 | 61 | 57 | 49 | 64 | 57 |

Example 5

Figure 6:
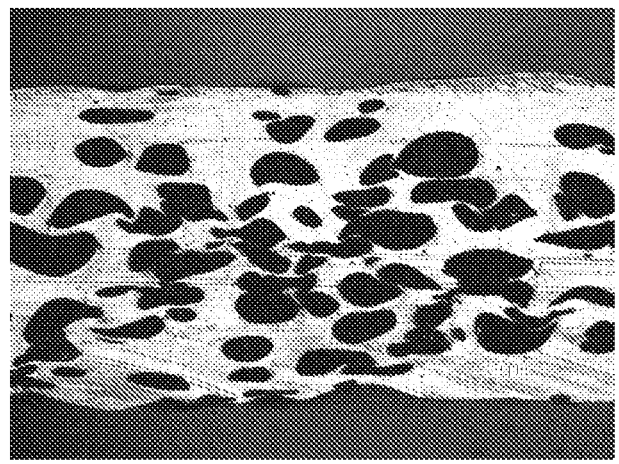
FIG. 6 is a micrograph image of a cross-section of the sheet of Sample 17 taken perpendicular to the flow direction.
Figure 7:
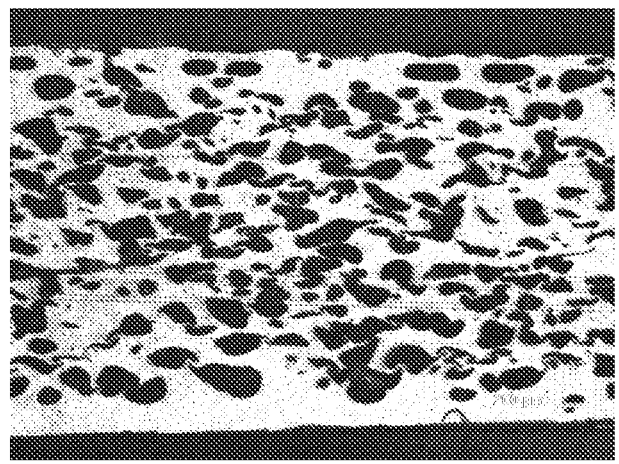
FIG. 7 is a micrograph image of a cross-section of the sheet of Sample 18 taken perpendicular to the flow direction.

In this example, two single-layer foamed lightweight sheets (Samples 17 and 18) were produced using a similar method as described in Example 1 except that SABIC Lexan™ FST resin and another chemical blowing agent are used instead of Lexan 103R resin and sodium bicarbonate. The two foamed sheet samples do not have a solid caplayer either. The composition difference is summarized in Table 14. The thickness, density, number-average foam bubble sizes and mechanical data of both sheet samples are summarized in Table 15. Both samples have 35~40% weight reduction compared to the solid control sheet (Sample 19) that is made of the same resin but without a foam structure. As expected, the presence of PARALOID™ EXL2335 impact modifier (supplied from The Dow Chemical Company) in Sample 18 helps to improve the ductility of the foamed sheet as shown by higher tensile elongation of Sample 18 compared to that of Sample 17. It was surprisingly found that Sample 18 also has smaller average foam bubble cell size than Sample 17 as shown in FIG. 6 (Sample 17), FIG. 7 (Sample 18), and Table 15.

Not to be bound by theory, it is believed that the core-shell rubber particle such as PARALOID™ EXL2335 work as an effective nucleating agent that facilitates initial formation of foam bubbles out of the gas originally dissolved in the polymeric melt during the foamed sheet extrusion process. This explains why the average foam bubble size is smaller with presence of the core-cell rubber particles in Sample 18 versus 17 in Example 5. PARALOID™ EXL2335 impact modifier has a cross-linked poly (butyl acrylate) core with a grafted polymethyl methacrylate shell. The core-shell structure allows the impact modifier to disperse as discrete particles in the Lexan™ FST resin matrix, and the cross-linked core maintains the rubber particle size that is not influenced by compounding and extrusion process, which is a desirable characteristic for both impact modifiers and/or foam nucleating agents. Although this example illustrates the usefulness of only a specific type of core-shell rubber additive based on cross-linked poly (butyl acrylate) core, the other types of core-shell rubber with different cross-linked or partially cross-linked rubber core should work in a similar way, which include the core-shell rubber additives based on butadiene rubber, styrene-butadiene rubber, acrylonitrile-butadiene rubber, and silicone-acrylic rubber.

TABLE 14

| Sample ID | Sample formulation description |
|---|---|
| 17 | Foamed sheet made of 99 wt. % of SABIC FST resin grade FST9705 and 1 wt. % a proprietary chemical blowing agent |
| 18 | Foamed sheet made of 89 wt. % of SABIC FST resin grade FST9705, 10 wt. % of PARALOID ™ EXL2335 impact modifier, and 1 wt. % of the same proprietary chemical blowing agent as above |
| 19 | Solid control sheet made of SABIC FST resin grade FST9705 |

TABLE 15

| | | Sample ID | | |
|---|---|---|---|---|
| Property | Units | 17 | 18 | 19 |
| Tg of the polymer in the sheet | ° C. | 140 | 137 | 40 |
| Thickness | mm | 1.0 | 1.1 | 1.1 |
| Density | g/cm³ | 0.88 | 0.81 | 1.34 |
| Average foam bubble size from TD image* | μm | 100 | 49 | — |
| Initial Mw of sample before pressure cooker treatment | dalton | 24,452 | 22,557 | 24,736 |
| Mw retention after 24 hour in pressure cooker** | % | 81 | 74 | 81 |
| MAI-Total energy | J | 2 | 2 | 26 |
| Tensile Modulus | MPa | 1068 | 783 | 2388 |
| Tensile Strength at Break | MPa | 28 | 22 | 63 |
| Tensile elongation at Break | % | 12 | 23 | 71 |

*Average foam bubble size is the number-average diameter of foam bubbles measured from the two-dimensional microscopy images of the cross-sectional sample surface that is perpendicular to the extrusion direction (TD) of the lightweight polymeric sheet. Although diameters implies a spherical or circular shape, the term diameter as used herein also refers to average span or width of a foam bubble that is not spherical, or not circular in the two-dimensional image. The above number-average diameter of foam bubbles is calculated using Clemex Image Analysis software by assuming that individual bubbles all have circular shape but still maintain the same area of their individual size.
**Pressure cooker treatment condition is set at 121° C. and 18 psi (0.124 MPa) moisture pressure.

Example 6

Figure 8:
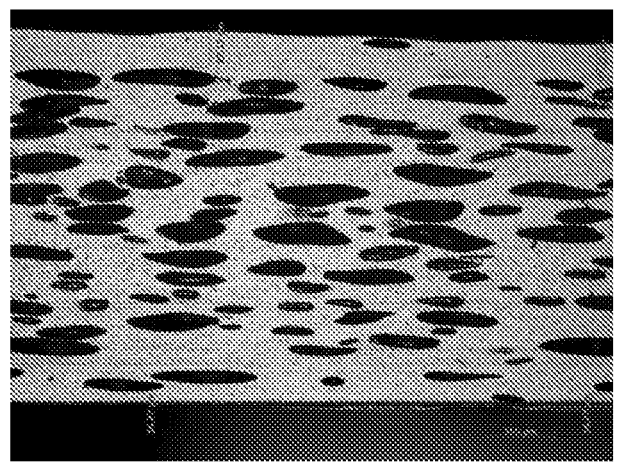
FIG. 8 is a micrograph image of a cross-section of the sheet of Sample 20 taken along the flow direction.
Figure 9:
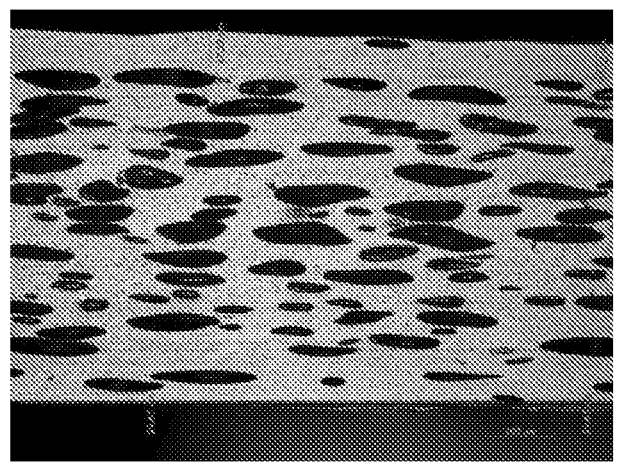
FIG. 9 is a micrograph image of a cross-section of the sheet of Sample 21 taken along the flow direction.
Figure 10:
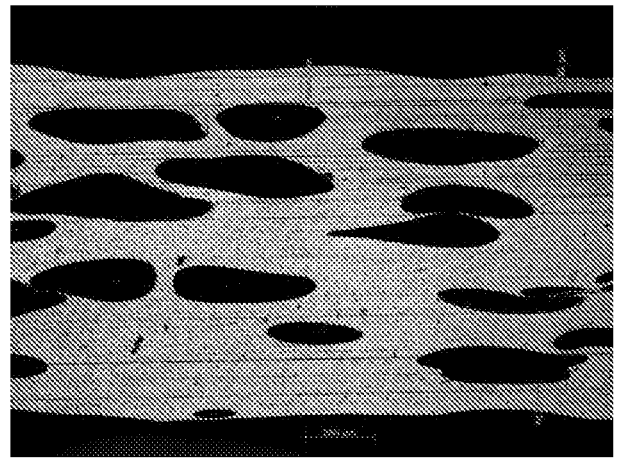
FIG. 10 is a micrograph image of a cross-section of the sheet of Sample 22 taken along the flow direction.
Figure 11:
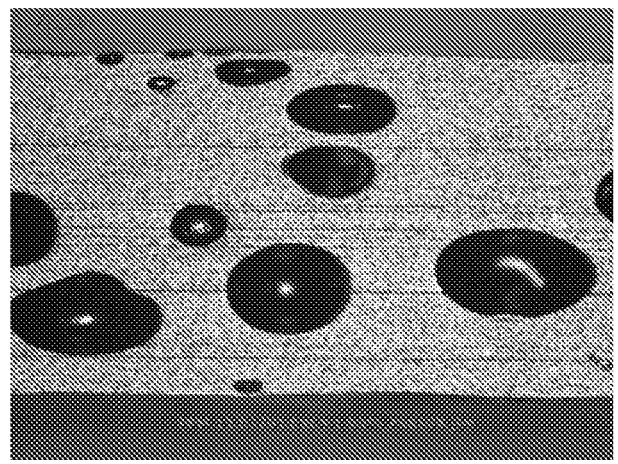
FIG. 11 is a micrograph image of a cross-section of the sheet of Sample 23 taken along the flow direction.

In this example, four single-layer foamed sheets (Sample 20 through 23) and their corresponding solid sheet control (Sample 24 through 27, i.e., made of the same resin but without using a blowing agent) were produced using SABIC Cycoloy™ resins and a similar method as described in Example 1. To make foamed sheet Samples 20 through 27, 1 wt. % of a chemical blowing agent was used. Samples 20 and 24 comprised Formula A, Samples 21 and 25 comprised Formula C, Samples 22 and 26 comprised Formula C, and Samples 23 and 27 comprised Formula D. The Cycoloy™ resin formulations of these sheet samples are described in Table 16. The thickness, density, average foam bubble elongation, and mechanical properties of both foamed sheets and solid control sheets samples are summarized in Table 17. All foamed sheets have 26-32% weight reduction versus their solid sheet controls. As expected, the tensile modulus of either foamed sheets or solid control sheets increases when the talc loading level increases. However, we also surprisingly found that the foam sheet comprising 15% talc (Sample 23) have foam bubble of much less elongated compared to the other foamed sheets with less filler content or no fillers, as shown in FIG. 11 in comparison to FIG. 8 through FIG. 10.

TABLE 16

| Item Description | Unit | Formulations | | | |
|---|---|---|---|---|---|
| | | A | B | C | D |
| PC | | 81.2 | 76.1 | 71.1 | 66.0 |
| ABS RESIN | wt. % | 18 | 18 | 18 | 18 |
| Fine Talc | wt. % | 0 | 5 | 10 | 15 |
| SEENOX 412S (pentaerythritol betalaurylthiopropionate) | wt. % | 0.25 | 0.25 | 0.25 | 0.25 |
| PHOSPHITE STABILIZER | wt. % | 0.1 | 0.1 | 0.1 | 0.1 |
| MONO ZINC PHOSPHATE (MZP) | wt. % | | 0.1 | 0.1 | 0.2 |
| HINDERED PHENOL ANTI-OXIDANT | wt. % | 0.25 | 0.25 | 0.25 | 0.25 |
| PENTAERYTHRITOL TETRASTEARATE | wt. % | 0.25 | 0.25 | 0.25 | 0.25 |
| Total | wt. % | 100 | 100 | 100 | 100 |

TABLE 17

| Property | | Unit | Sample ID | | | | | | | |
|---|---|---|---|---|---|---|---|---|---|---|
| | | | 20 | 21 | 22 | 23 | 24 | 25 | 26 | 27 |
| Talc Loading | | wt % | 0 | 5 | 10 | 15 | 0 | 5 | 10 | 15 |
| Thickness | | Mm | 1.1 | 1.1 | 1.0 | 1.1 | 1.0 | 1.0 | 1.0 | 1.0 |
| Density | | g/cm$^3$ | 0.84 | 0.90 | 0.92 | 0.86 | 1.18 | 1.22 | 1.25 | 1.26 |
| Wt. Reduction percentage relative to solid control | | % | 29 | 27 | 26 | 32 | 0 | 0 | 0 | 0 |
| foam bubble aspect ratio (l/w) | | — | 3-5 | 3-5 | 3-5 | ~2 | — | — | — | — |
| Mw of initial sample | | dalton | 28,440 | 29,001 | 28,774 | 28,760 | 28,585 | 28,342 | 28,694 | 27,746 |
| Mw retension after 24 hr PCT | | % | 96 | 95 | 96 | 96 | 98 | 98 | 98 | 96 |
| Initial mechanical (MD & TD Average) | MAI-total energy | J | 3 | 2 | 2 | 1 | 16 | 12 | 9 | 7 |
| | Tensile Modulus | MPa | 1391 | 1584 | 1883 | 2026 | 2683 | 3317 | 3958 | 4118 |
| | Tensile Strength at break | MPa | 28 | 27 | 27 | 27 | 49 | 46 | 45 | 50 |
| | Tensile elongation at break | % | 23 | 15 | 7 | 5 | 80 | 22 | 7 | 4 |

Lightweight foam sheets with a weight reduction of 30% from different polymeric resins were successfully achieved using different chemical blowing agents to meet weight reduction and, surprisingly, meeting specialized flame safety test requirements for transportation and having an ability for texturing during calendaring operations as well as self-texturing during thermoforming.

It is instructive to explain certain designations and nomenclature described herein. Particle sizes of the rubber particles or inorganic fillers, unless indicated otherwise, are given in micrometers, $10^{-6}$ meters. As will be appreciated by those skilled in the art, particle sizes are expressed in diameters. Although diameters might imply a spherical or round shape, the term diameter as used herein also refers to the average span or width of a particle that is not spherical. A designation used herein is "$D_{50}$" that is defined as a particle size at 50% counted from a smaller size side on a number base in a cumulative particle size distribution. All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %,"

etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. As used herein, "or" means "and/or" unless specified otherwise.

The figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the description of the figures for the sake of clarity, these terms are intended to refer only to the particular structure of the embodiments selected for illustration in the figures, and are not intended to define or limit the scope of the disclosure. In the figures and their corresponding descriptions, it is to be understood that like numeric designations refer to components of like function.

All cited patents, patent applications, and other references are incorporated herein by reference in their entirety. However, if a term in the present application contradicts or conflicts with a term in the incorporated reference, the term from the present application takes precedence over the conflicting term from the incorporated reference While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A polymeric sheet, comprising:
   a foamed layer comprising a polymeric material, wherein the polymeric material has a Tg of greater than or equal to 100° C., wherein the foamed layer has cells of a closed cell type;
   wherein foamed layer was foamed with a chemical blowing agent is at least one of monosodium citrate, citric acid, 5-phenyl-3,6-dihydro-2H-1,3,4-oxadiazin-2-one, and 5-phenyl-1H-Tetrazole; and
   wherein the sheet has a weight reduction of 10% to 60%, as compared to a solid sheet of the same geometry and size formed from the same polymeric material;
   wherein the sheet, at the thickness of 1.0 mm, has a smoke density of less than or equal to 200 after four minutes of burning according to ASTM E662-06;
   wherein the sheet is thermoformable; and
   wherein the sheet, at a thickness of 1.0 mm, passes at least one of the following heat release requirements:

1) has a two minute integrated heat release rate of less than or equal to 65 kilowatt-minutes per square meter and a peak heat release rate of less than 65 kilowatts per square meter according to Part IV, OSU Heat Release of FAR/JAR 25.853, Amendment 25-116; and
   2) has a maximum averaged rate of heat emission (MARHE) of less than or equal to 90 kW/m$^2$ with 50 kW/m$^2$ irradiance level test condition according to ISO 5660-1.

2. The lightweight polymeric sheet of claim 1, wherein the sheet has a density of greater than 0.60 g/cm$^3$ to less than or equal to 1.1 g/cm$^3$ and/or wherein the sheet has self-texturing and/or wherein at least one side of the sheet has a gloss level of less than 90 g.u. as measured at 60 degrees using ATSM DS2457-08e1 and a BYK Gardner Gloss Meter.

3. The sheet of claim 1, wherein the polymeric material comprises a poly-condensation polymer.

4. The sheet of claim 1, wherein the polymeric material comprises at least one from polycarbonate, polyarylate, polyester, polyetherimide, and combinations comprising at least one of the foregoing.

5. The sheet of claim 1, wherein the polymeric material comprises at least one from polyarylate, polyester, polyphenylene ether, polystyrene, acrylonitrile butadiene styrene, polyetherimide, polysiloxane, and combinations comprising at least one of the foregoing.

6. The sheet of claim 1, wherein the foamed layer further comprises core-shell rubber particles dispersed in the polymeric material, wherein the core-shell rubber particles have a median particle size ($D_{50}$) of 0.1 micrometer to 100 micrometers.

7. The sheet of claim 6, wherein the core-shell rubber particles comprise a cross-linked rubber core that comprises at least one from butadiene rubber, styrene-butadiene rubber, acrylonitrile-butadiene rubber, poly(alkyl acrylate) rubber, and silicone-acrylic rubber.

8. The sheet of claim 1, wherein the foamed layer further comprises greater than 10 wt. % of disc shaped inorganic filler dispersed in the polymeric material, based upon a total weight of the foamed layer.

9. The sheet of claim 1, wherein the foamed layer has an average foam bubble size of less than or equal to 100 micrometers; and wherein the average foam bubble size is the number-average diameter of foam bubbles measured from a two-dimensional microscopy image of a cross-sectional sample that is perpendicular to an extrusion direction of the foamed layer.

10. The sheet of claim 1, wherein the sheet has one or more of:
   a burn time at a thickness of 3.0 mm of less than or equal to 15 seconds and a burn length of less than or equal to 6 inches, wherein a longest burning particle self-extinguishes with less than or equal to 3 seconds according to a 60 second vertical burn test pursuant to FAR 25.853, Appendix F (2012), Part I, a, 1, I;
   a two minute integrated heat release rate at a thickness of 1.0 mm of less than or equal to 55 kilowatt-minutes per square meter and a peak heat release rate of less than 55 kilowatts per square meter, and passes Part IV, OSU Heat Release of FAR/JAR 25.853, Amendment 25-116;
   a smoke density at a thickness of 1.0 mm of less than or equal to 150 after four minutes of burning according to ASTM E662-06; and
   a flame spread index at a thickness of 1.0 mm of less than or equal to 35 when tested according to ASTM E 162-08.

11. The sheet of claim 1, the sheet has an initial weight average molecular weight, and wherein the sheet retains 70% or greater of the initial weight average molecular weight after the sample is subject to a pressure cooker treatment of 24 hours under 121° C. and 18 psi moisture pressure conditions.

12. The sheet of claim 1, wherein the polymeric material comprises a polycarbonate-polysiloxane copolymer.

13. The sheet of claim 1, wherein the polymeric material comprises an anti-drip agent and/or a flame retardant.

14. An article formed from the sheet of claim 1.

15. The article of claim 14, further comprising at least one solid layer adjacent to the sheet.

16. The article of claim 15, wherein the sheet is located between two solid layers and optionally further comprising a second foamed layer adjacent to at least one of the two solid layers or the sheet.

17. The article of claim 14, wherein the article is an aircraft interior component, railcar interior component, a motorized vehicle interior part, luggage, a shed, a garage, a tractor truck trailer skirt, a wind deflectors, or a panel.

18. A method of making the sheet of claim 1, comprising:
melting the polymeric material to form a melt;
combining the melt and a chemical blowing agent to form a mixture;
neutralizing counterions produced by the blowing agent;
nucleating bubbles in the mixture to produce cells; and
forming the mixture into a sheet comprising an expanded core layer.

19. The method of claim 18, wherein forming the mixture into a sheet comprises extruding the mixture.

20. The method of claim 18, wherein the melt and the chemical blowing agent are combined in an extruder.

* * * * *